April 22, 1952 W. H. ROOKSBY 2,593,611
PLANT FOR SHAPING ASBESTOS CEMENT
Filed June 1, 1946 20 Sheets-Sheet 1

Inventor:
William H. Rooksby,
By Thomas E. Scofield,
Attorney.

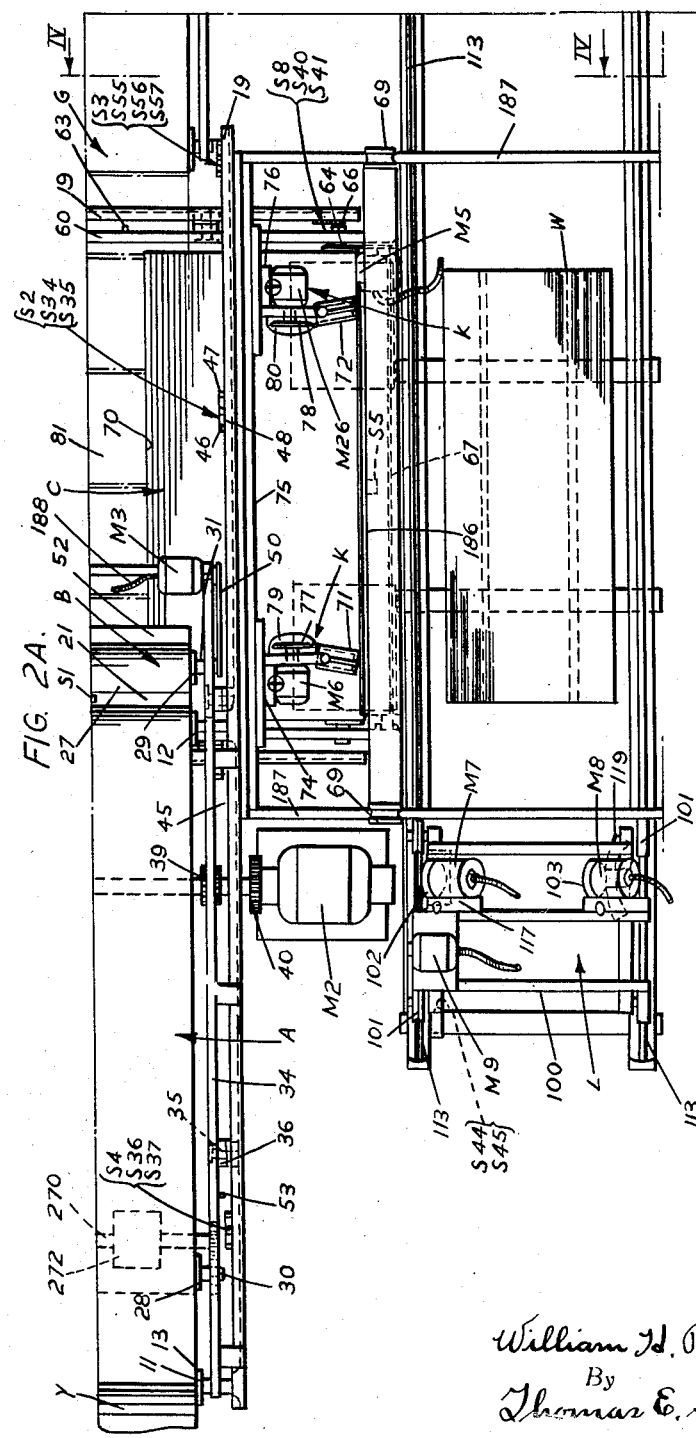

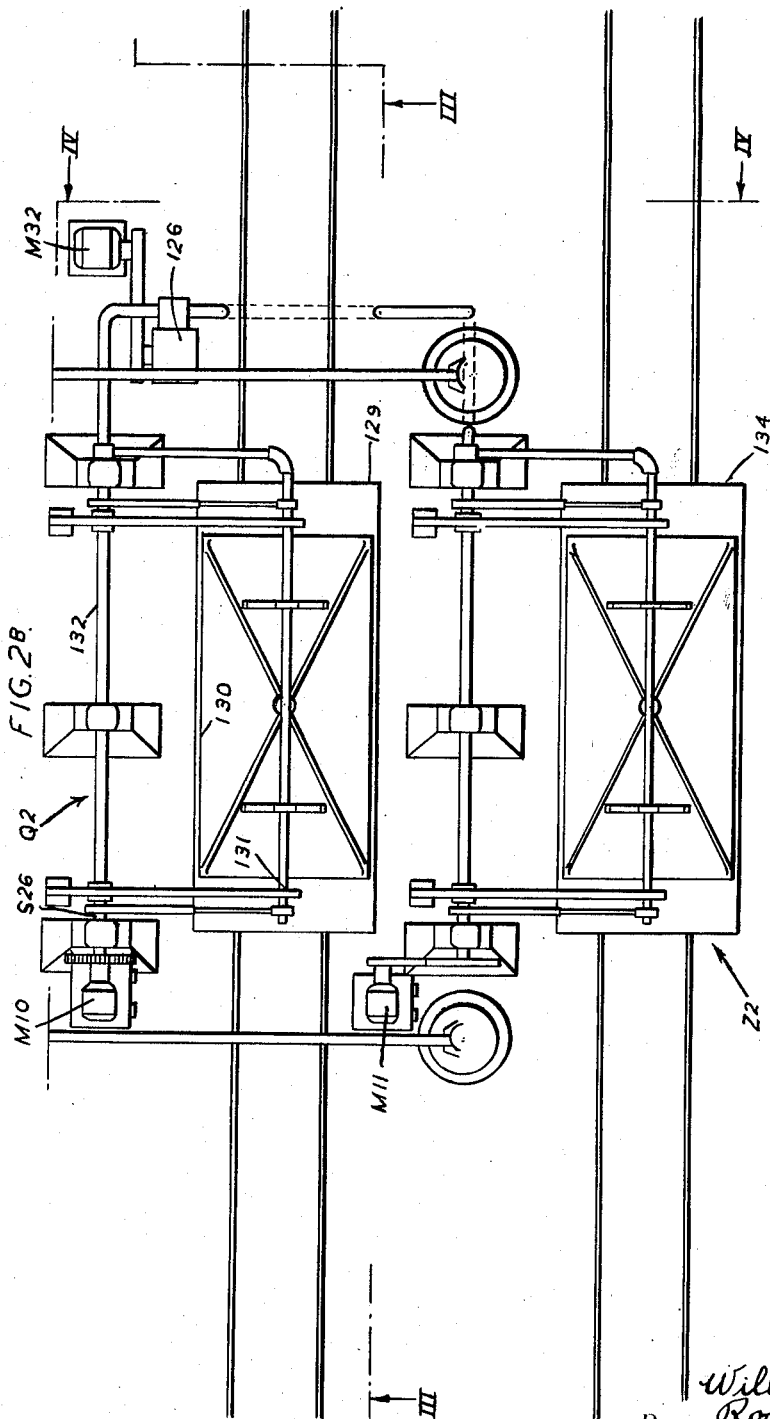

April 22, 1952 W. H. ROOKSBY 2,593,611
PLANT FOR SHAPING ASBESTOS CEMENT
Filed June 1, 1946 20 Sheets-Sheet 5
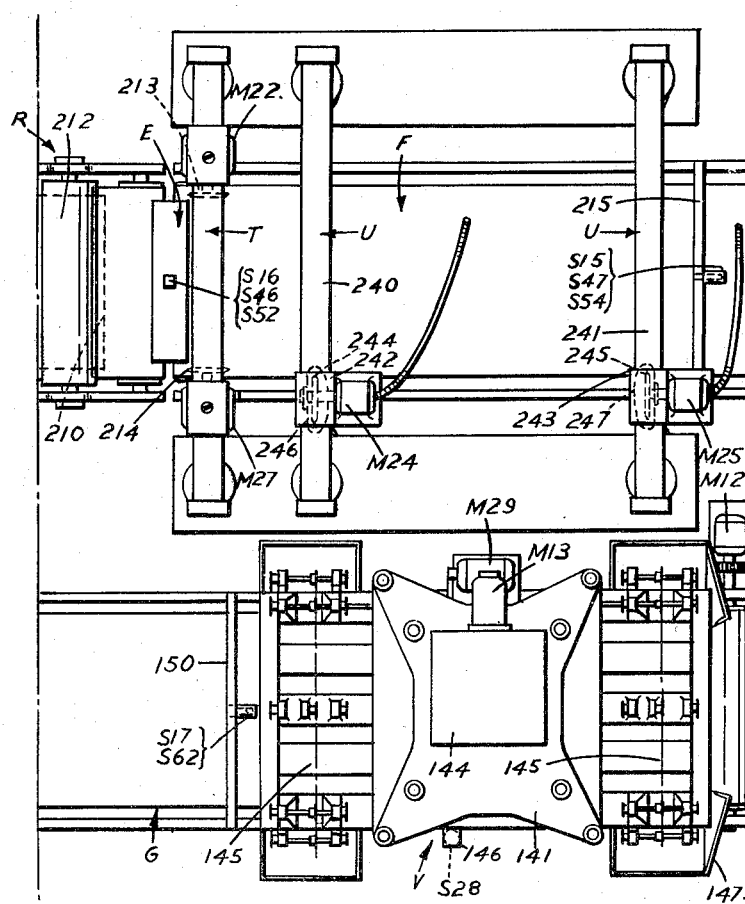
FIG.2c.
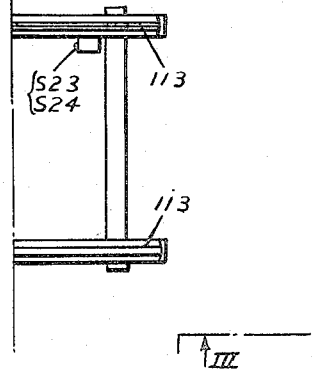
Inventor
William H. Rooksby,
By Thomas E. Scofield,
Attorney

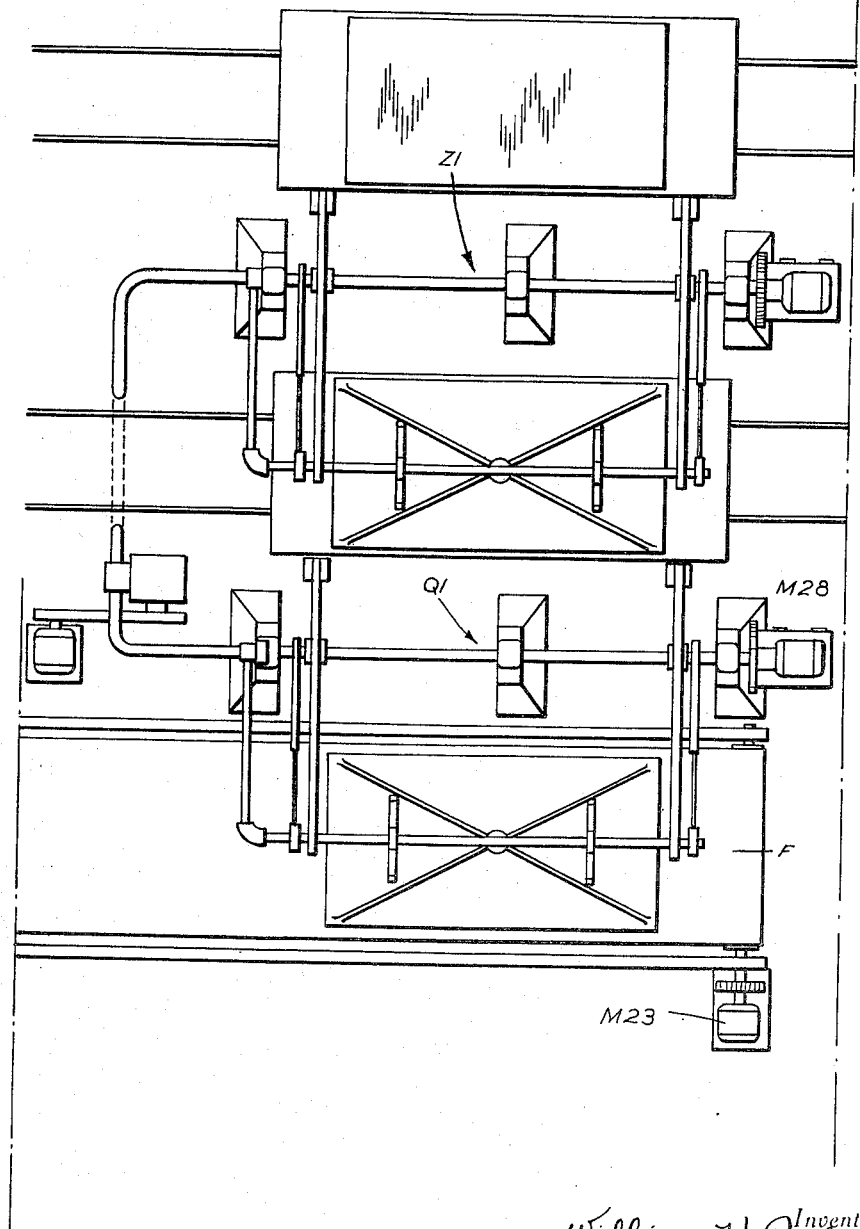

April 22, 1952 W. H. ROOKSBY 2,593,611
PLANT FOR SHAPING ASBESTOS CEMENT
Filed June 1, 1946 20 Sheets-Sheet 7
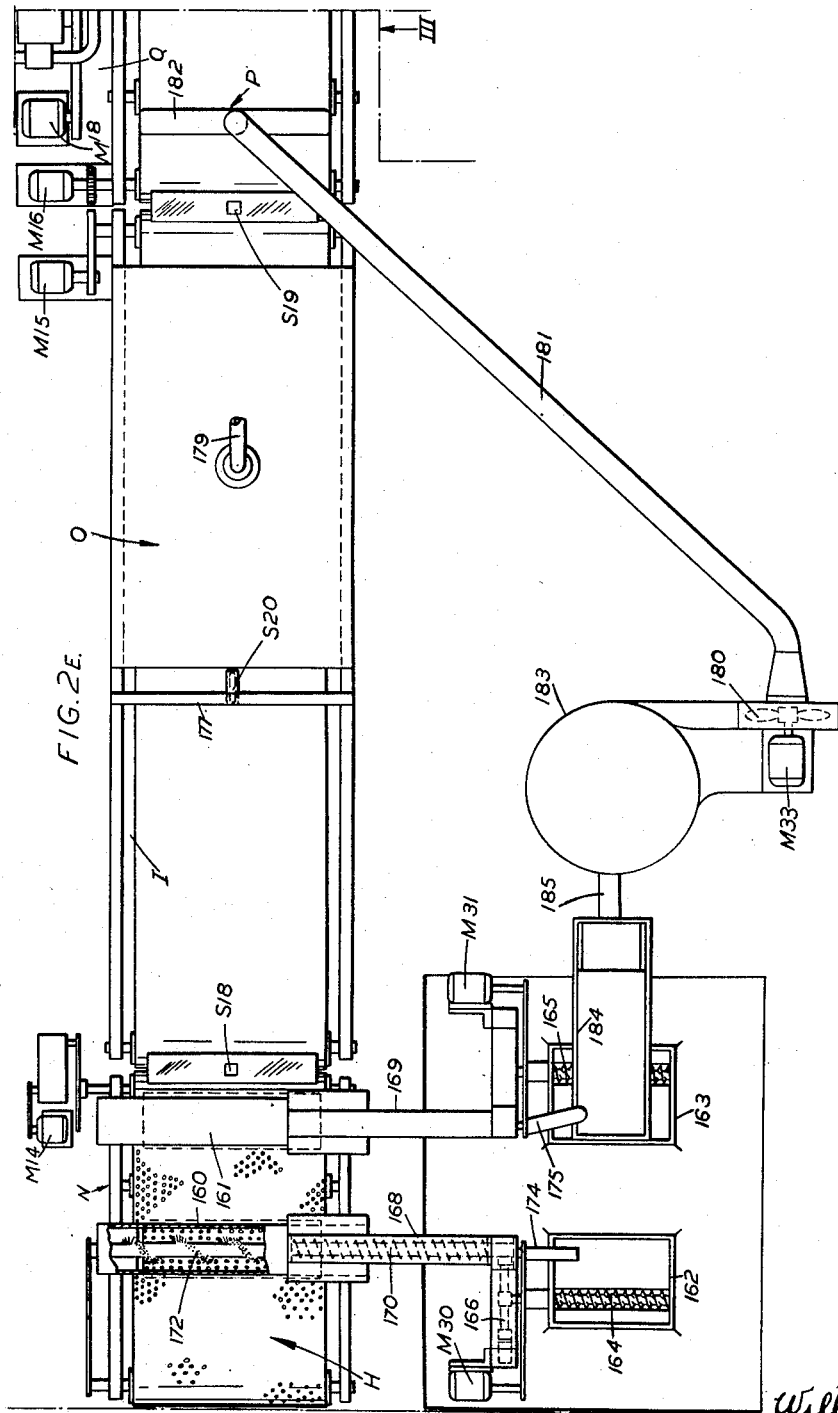
Inventor
William H.
Rooksby,
By Thomas E. Scofield,
Attorney.

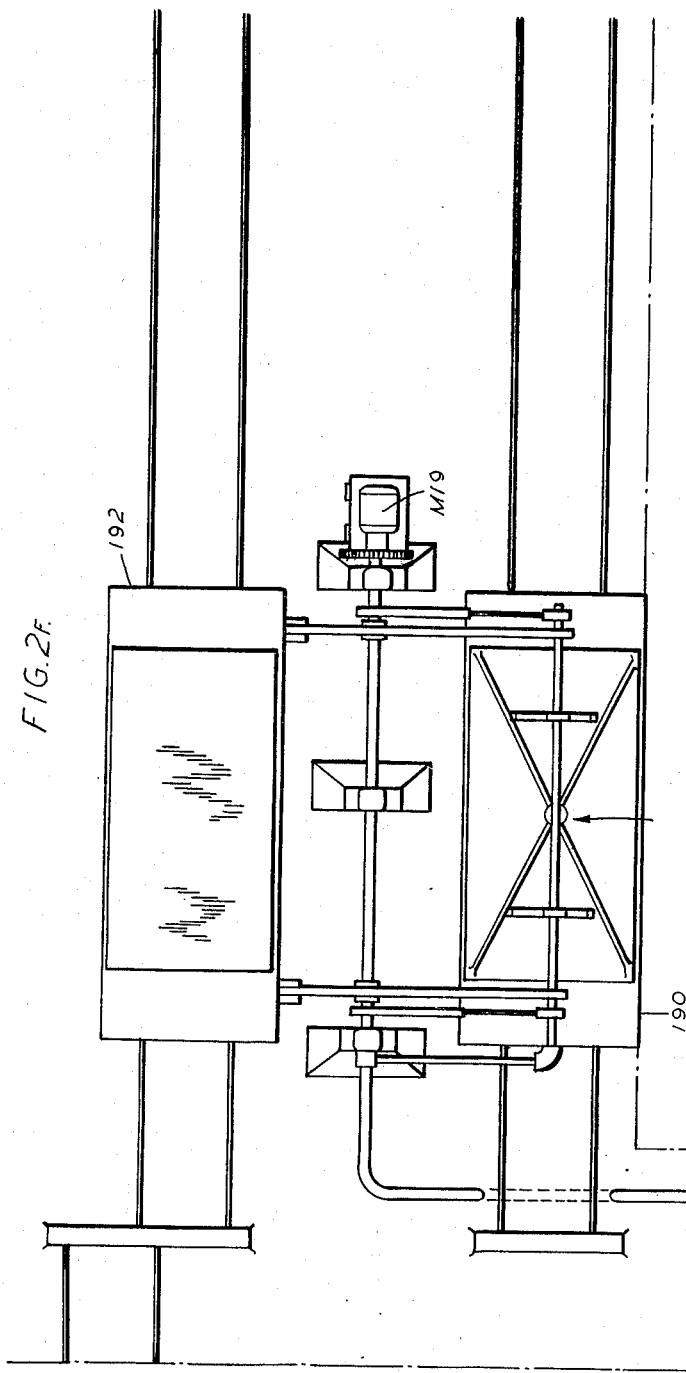

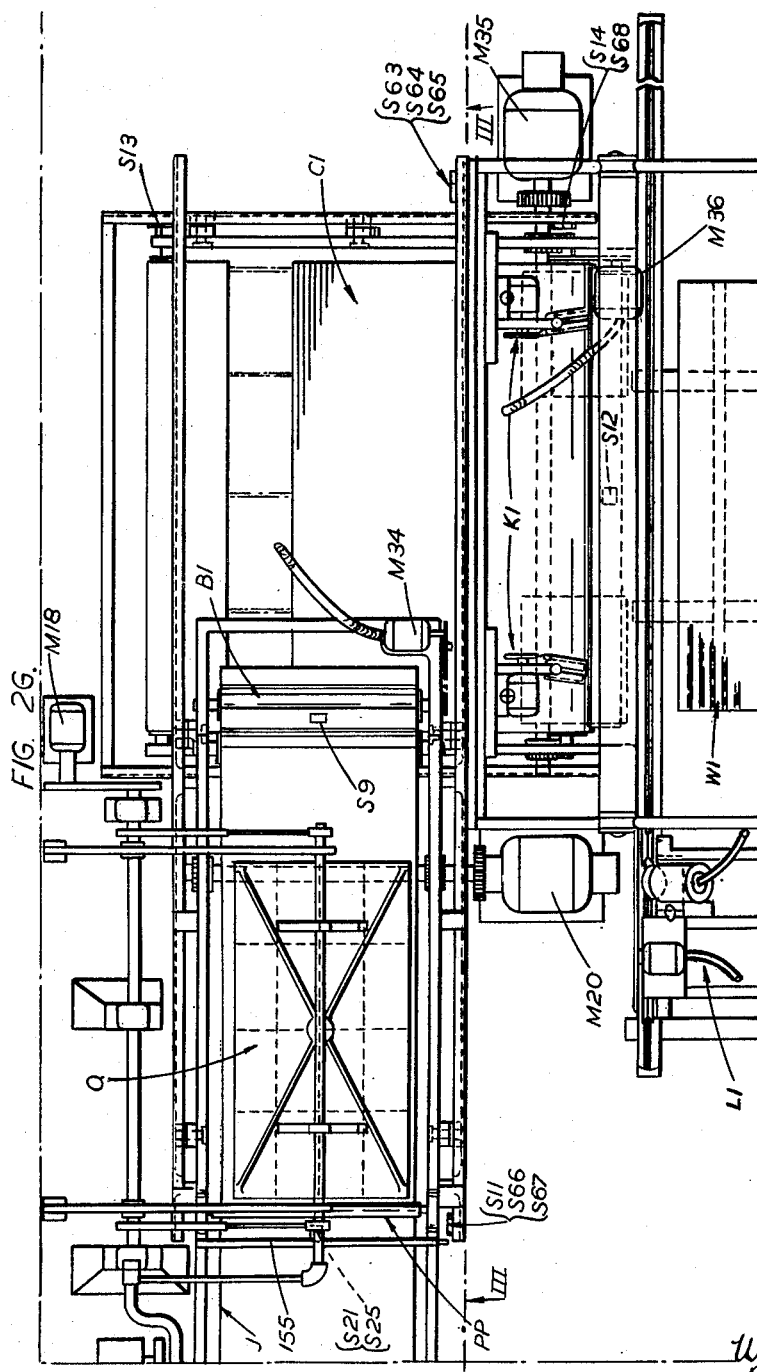

April 22, 1952 W. H. ROOKSBY 2,593,611
PLANT FOR SHAPING ASBESTOS CEMENT
Filed June 1, 1946 20 Sheets-Sheet 10

Inventor
William H. Rooksby,
By Thomas E. Scofield,
Attorney.

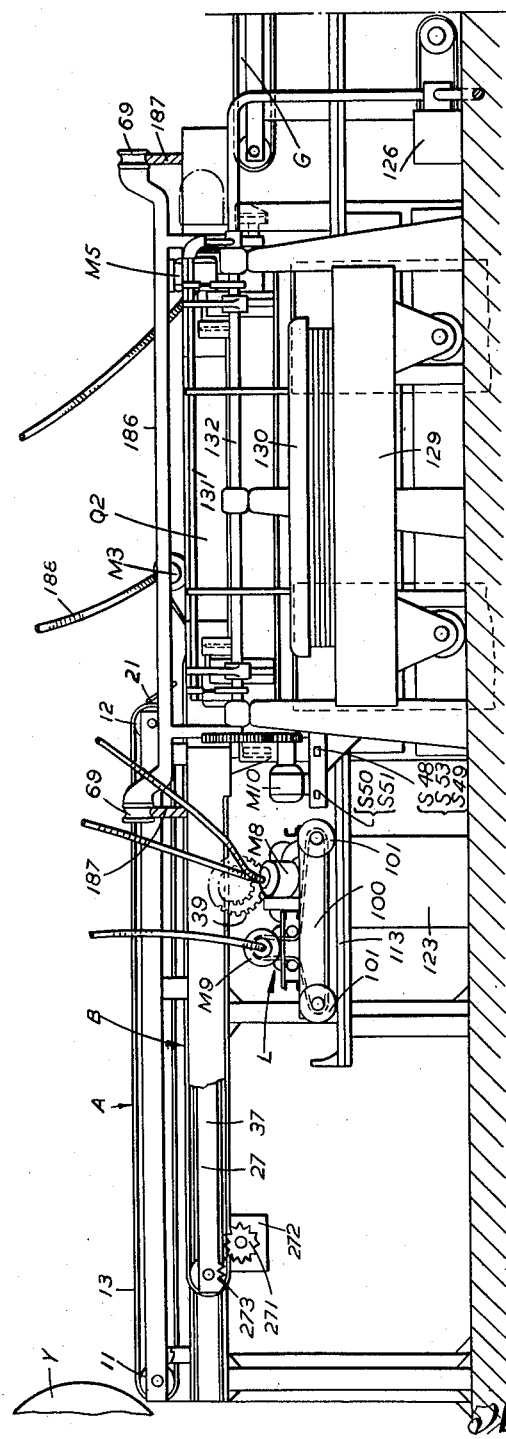

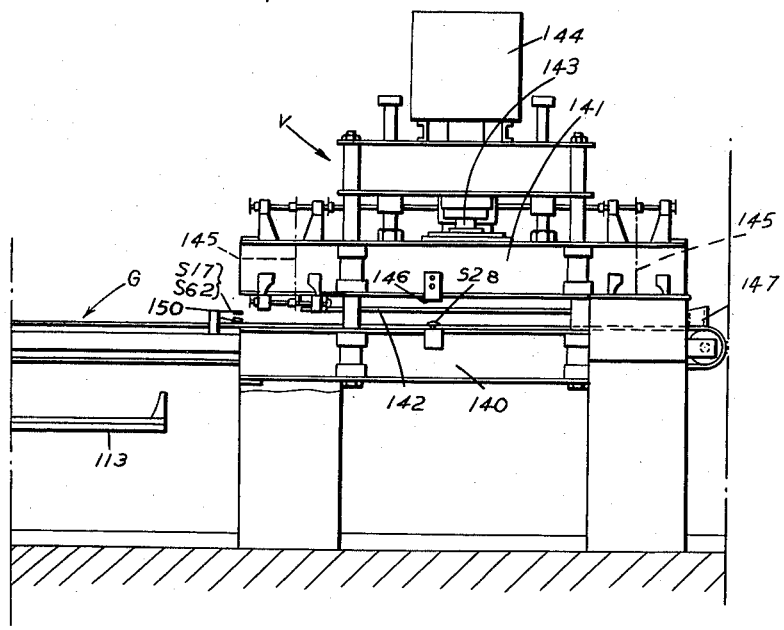
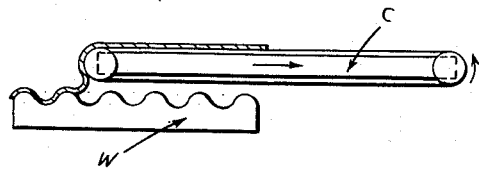

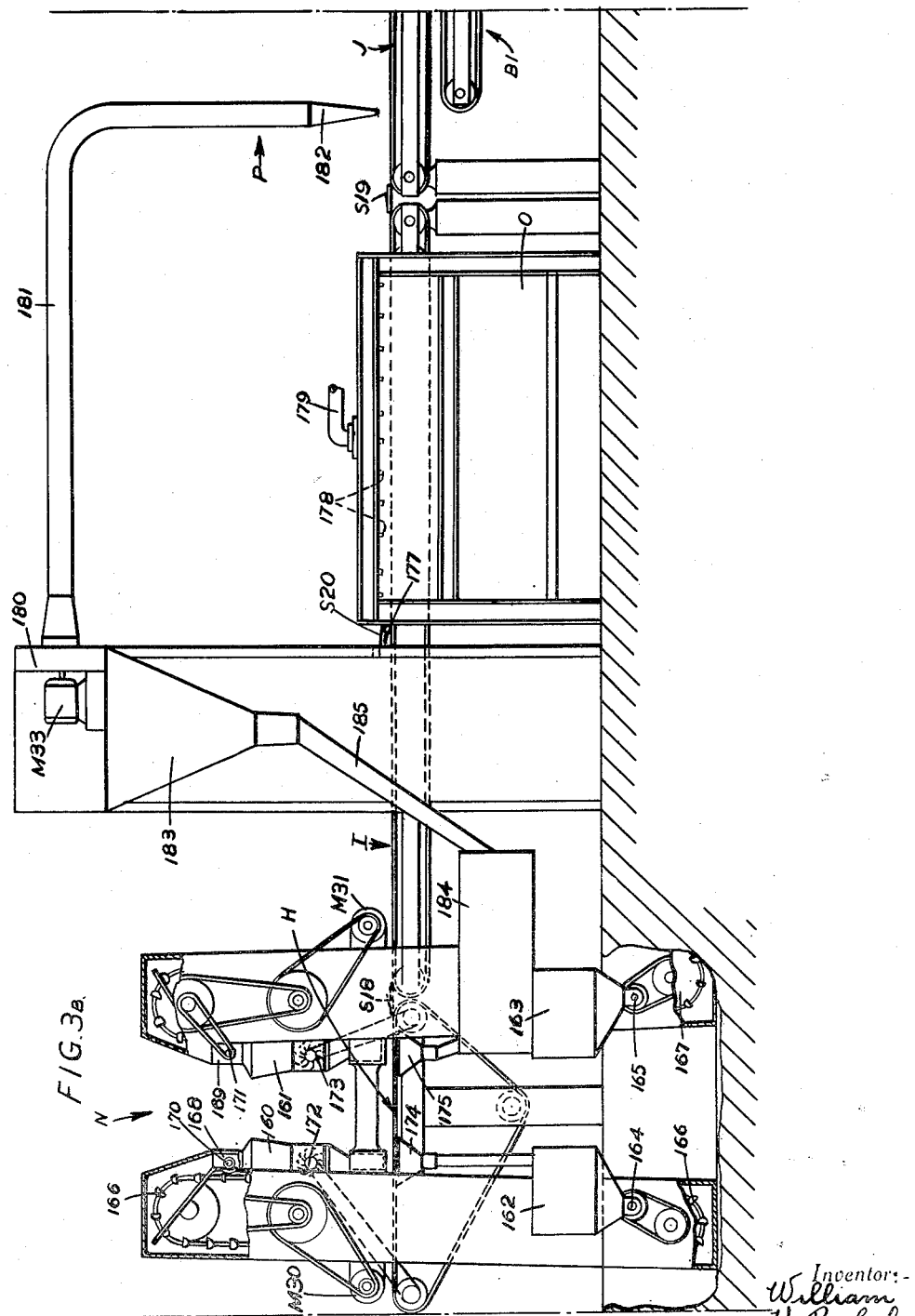

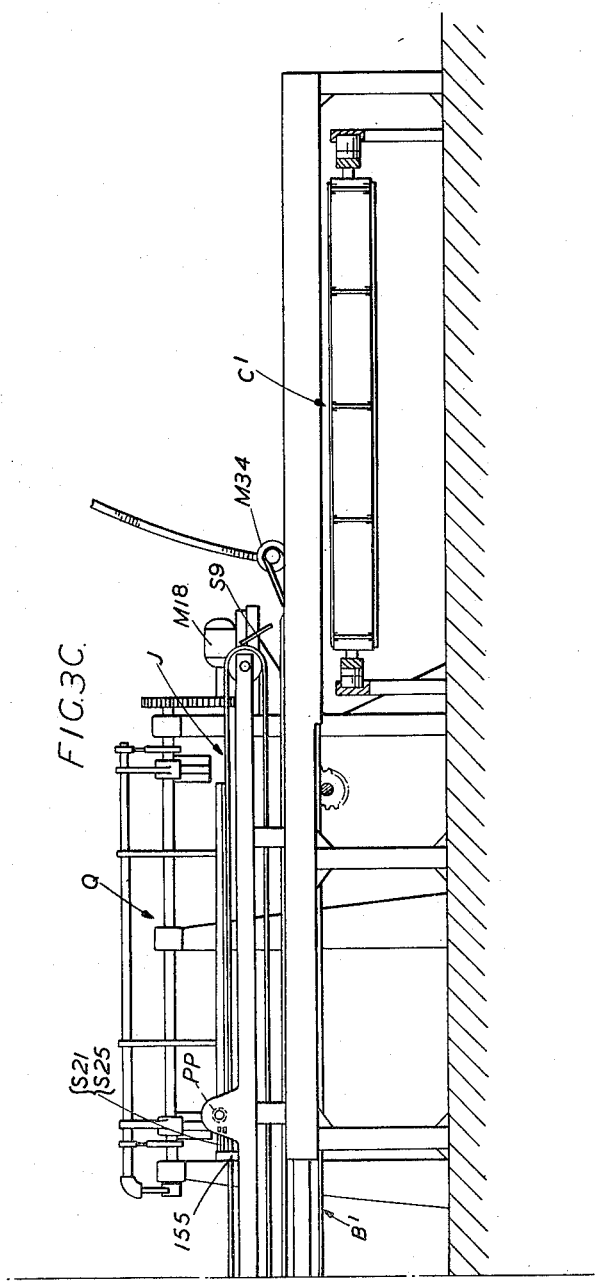

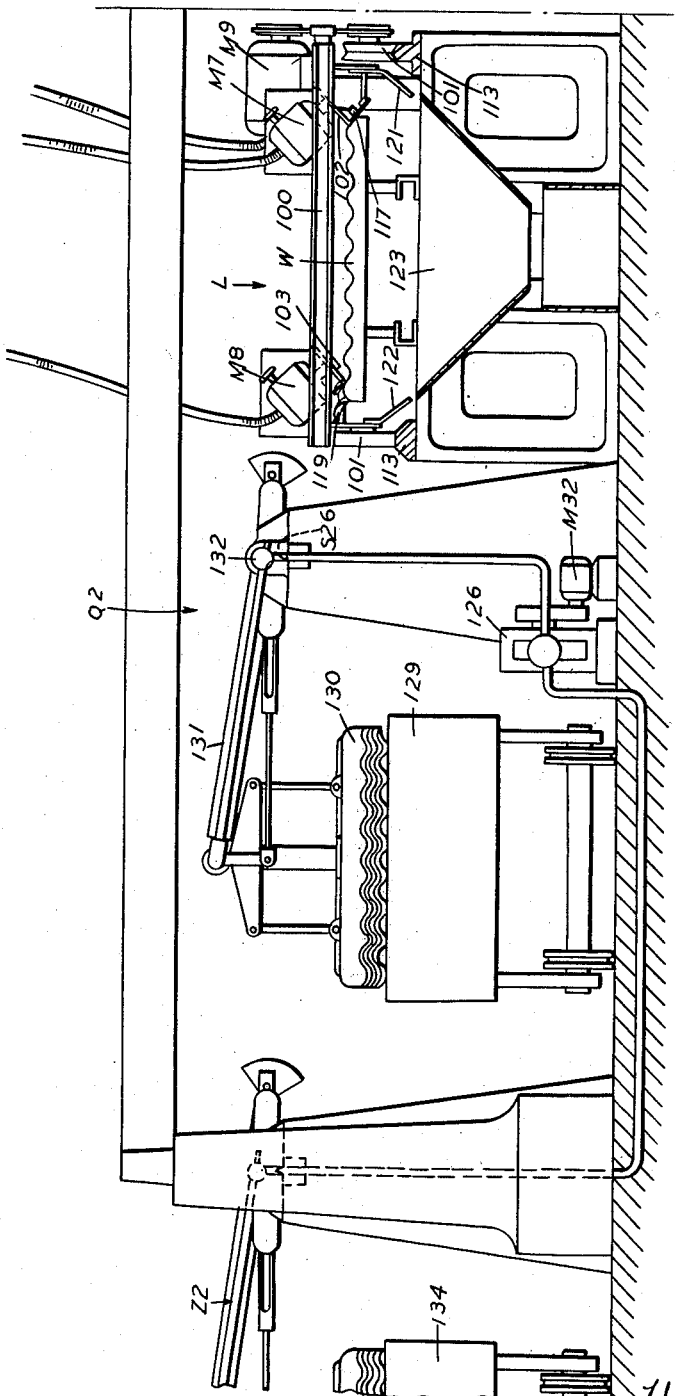

April 22, 1952 W. H. ROOKSBY 2,593,611
PLANT FOR SHAPING ASBESTOS CEMENT
Filed June 1, 1946 20 Sheets-Sheet 16
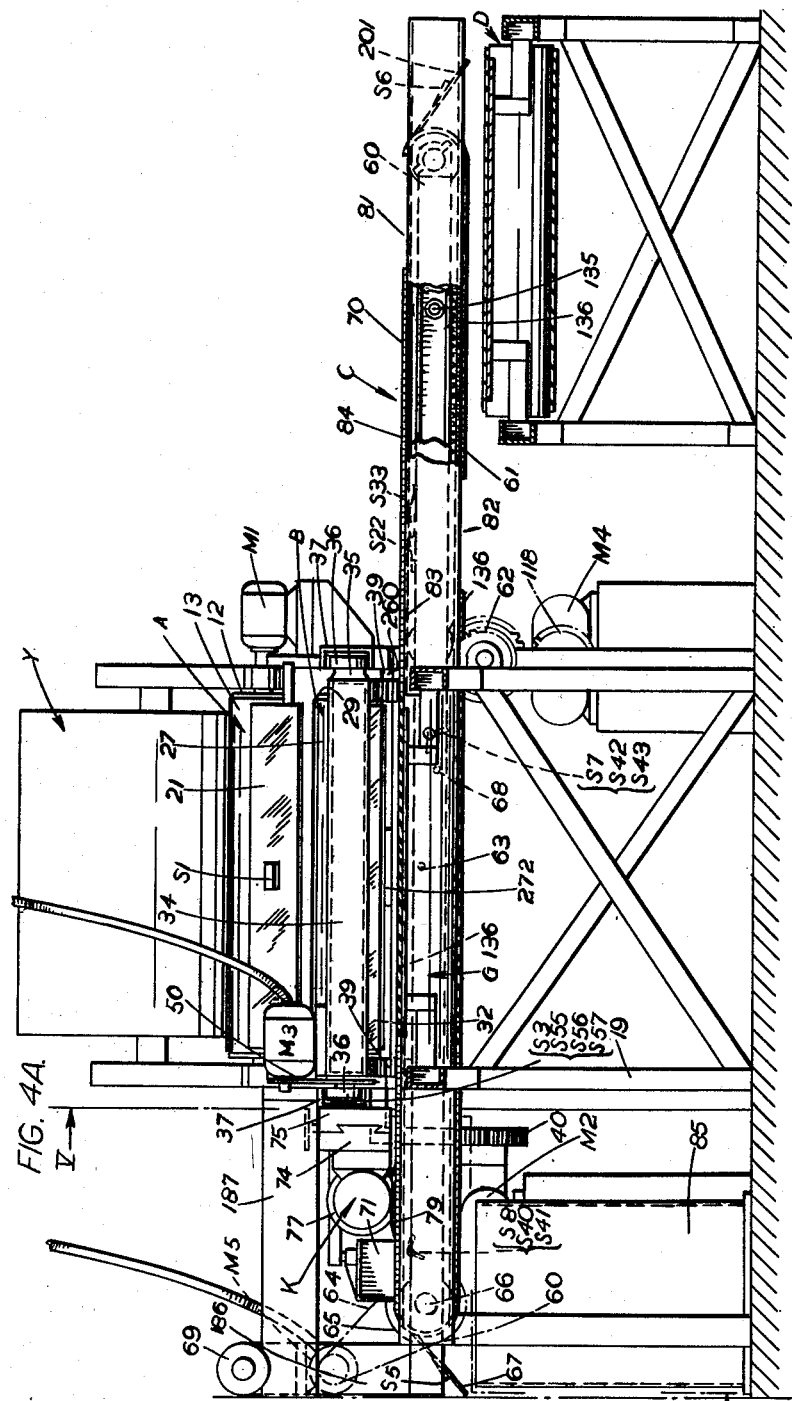
FIG. 4A.
Inventor
William H.
Rooksby,
By
Thomas E. Scofield,
Attorney.

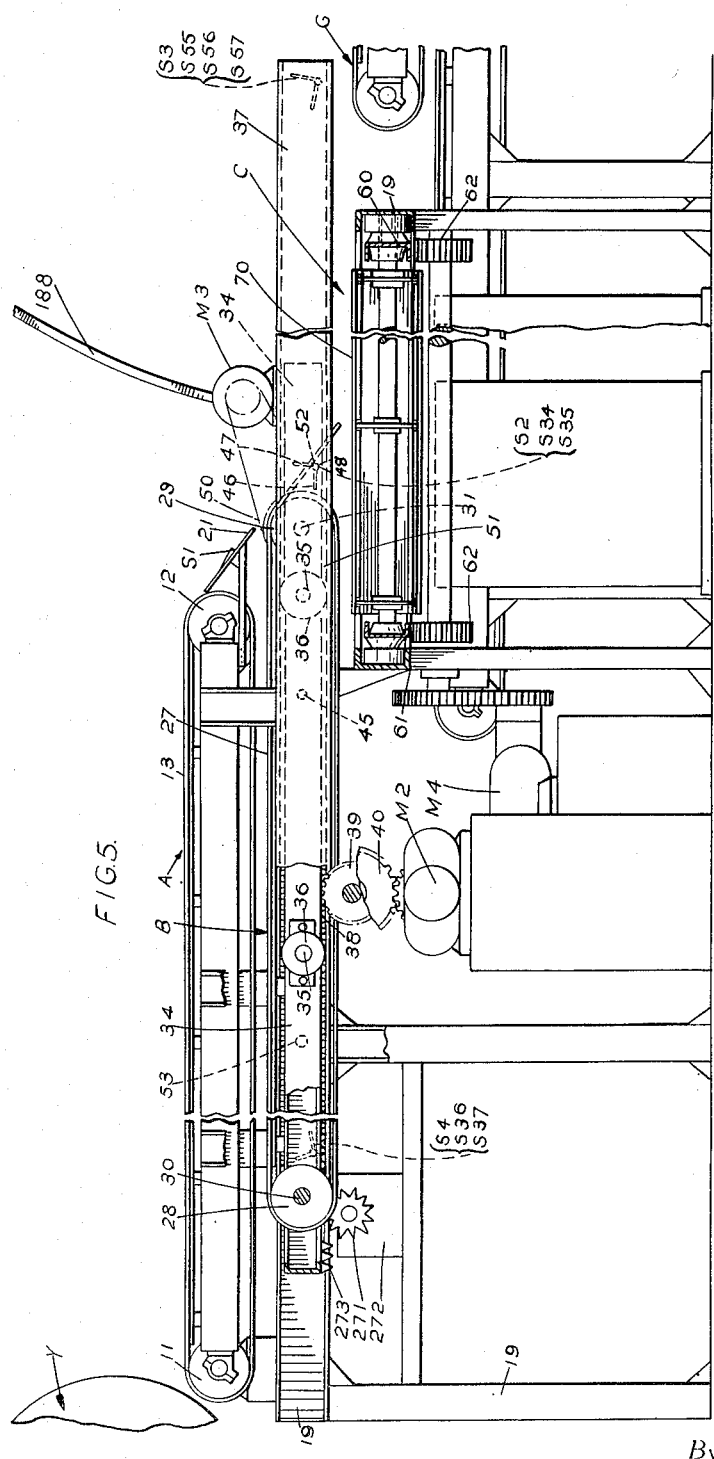

April 22, 1952 W. H. ROOKSBY 2,593,611
PLANT FOR SHAPING ASBESTOS CEMENT
Filed June 1, 1946 20 Sheets-Sheet 18
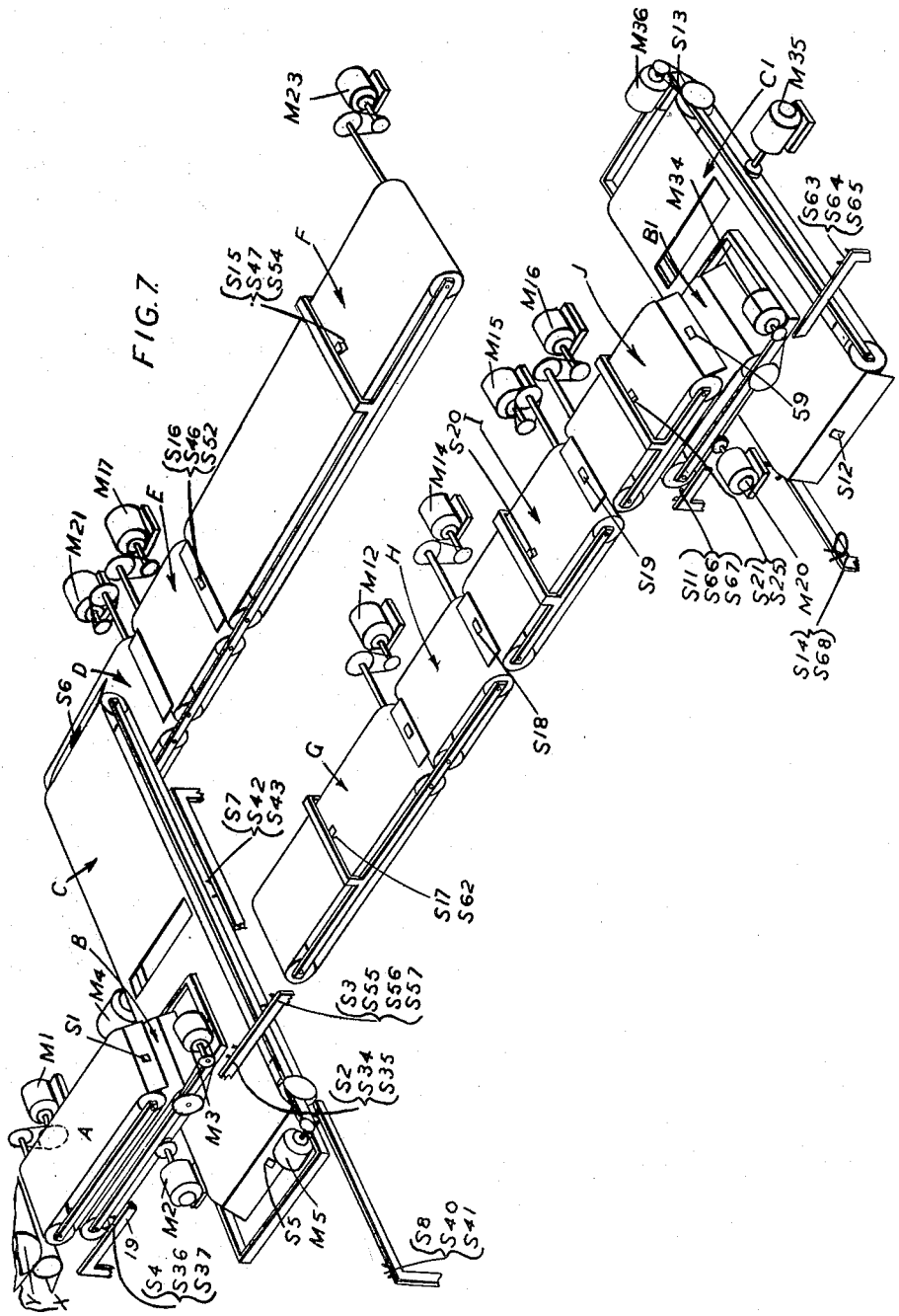

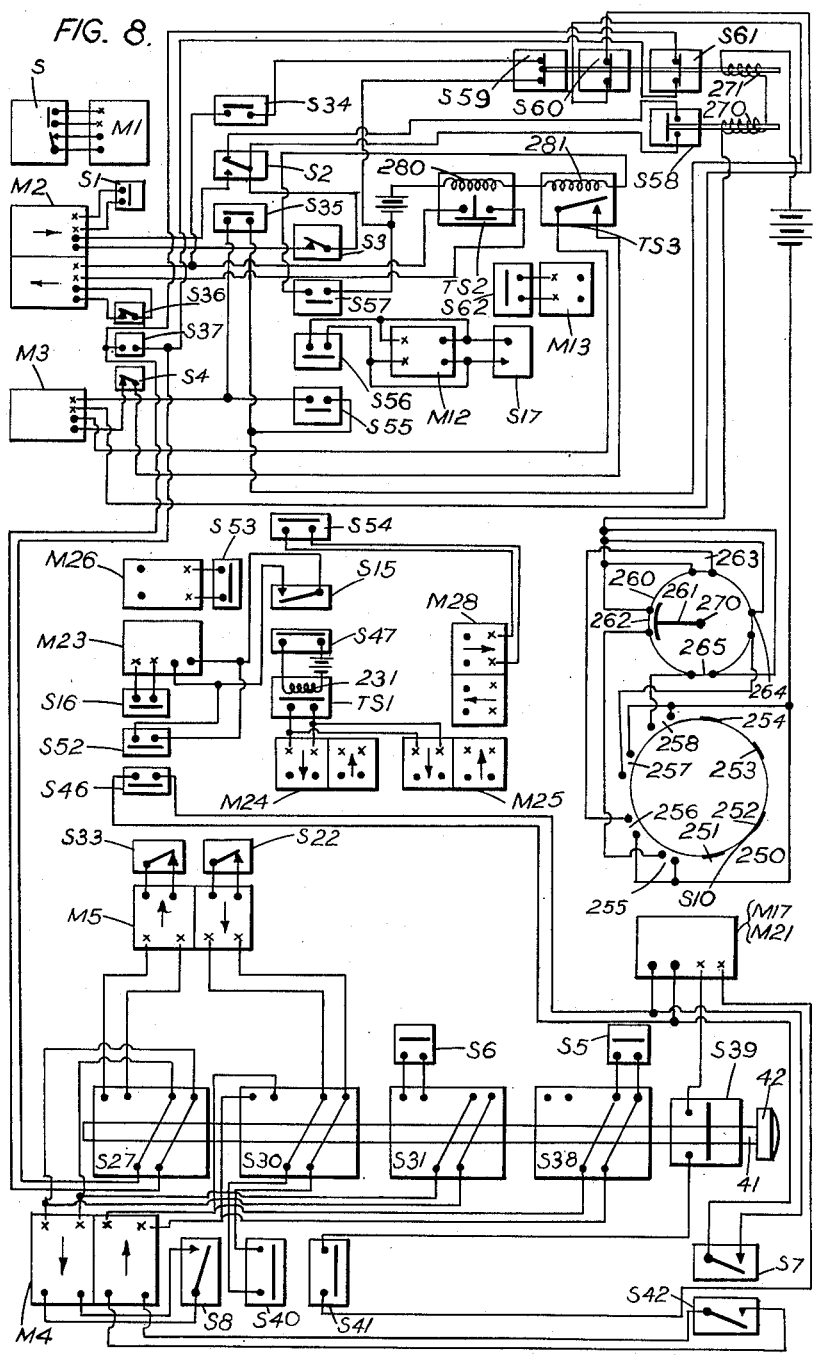

April 22, 1952 — W. H. ROOKSBY — 2,593,611
PLANT FOR SHAPING ASBESTOS CEMENT
Filed June 1, 1946

Patented Apr. 22, 1952

2,593,611

UNITED STATES PATENT OFFICE 2,593,611

PLANT FOR SHAPING ASBESTOS CEMENT

William Holdsworth Rooksby, Trafford Park, England, assignor to Turners Asbestos Cement Company Limited, Spotland, Rochdale, England, a British company Application June 1, 1946, Serial No. 673,793
In Great Britain June 8, 1945

17 Claims. (Cl. 92—66)

In the production of flat or corrugated sheets, tiles or slates of asbestos-cement or the like, flat plastic sheets are first formed on a making machine. Before the plastic sheets can be allowed to set they always need some treatment. Thus if large flat sheets are being made they may have to be consolidated or trimmed at the sides and ends or both; if slates are being made the sheets must be cut to the desired sizes by a press or the equivalent; if the sheets are to be corrugated they must be put on appropriate formers or templates; and any of the products may have to be coloured. These products will all be referred to as shaped products. At the end of the various treatments the shaped products are usually stacked with alternating templates and allowed to dry and set in the stacks. The plastic sheets can easily be damaged while being handled, and a common practice is to wrap them round poles in order to carry them from the making machine to appropriate apparatus for performing the various functions.

Fundamentally this invention consists in mechanising the plant by which the plastic sheets are converted into the desired products, the sheets being carried through the plant by conveyors which in the main are intermittently driven and automatically controlled. Other novel features of the invention will also be described.

In the usual methods of manufacture of asbestos-cement a rotary cylinder is coated with material transferred to it, either by an endless carrier felt (in machines of the Hatschek type) or otherwise, and a cut is made parallel to the axis of the cylinder when each coating is thick enough. The operation of the cylinder is under the control of an operator and the intervals of time which elapse between the production of successive sheets vary, being dependent upon the skill of the operator.

Now in a mechanised plant there must be a number of operating stations, that is to say, places at which apparatus of one kind or another are installed for the purpose of cutting, trimming, colouring, stacking or otherwise treating or handling the sheets, and at some at least of these operating stations the sheet must be brought to a halt in a precise position in relation to the operating apparatus, that is to say, the apparatus must be associated with an intermittently moving conveyor. If the sheets are being coloured in the manner described in application No. 674,018 of even date herewith, now abandoned, they must be maintained in an oven for an exact period of time. These requirements make it imperative that on a conveyor long enough to carry more than one sheet at once each sheet should be exactly spaced in relation to the preceding sheet. In general, rubber band conveyors are the most convenient. However, the nature of the various operations is such that conveyors of different kinds must be used. For instance in a consolidating apparatus it is desirable to use a porous conveyor through which moisture expressed from the sheets can pass; if colouring matter is showered downwards an open work conveyor must be used to allow pigment which does not strike a sheet to fall through; and if the sheets must pass through an oven a metal conveyor must be used. Now even on any such conveyor which carries only one sheet at a time, the location of each sheet in the precise position desired at any operating station at which it must be brought to a halt necessitates independent control of that conveyor in order to avoid any inaccuracy such as might arise, for example, as a result of slip of a conveyor or of slip of the sheet relatively to a conveyor during transfer from one conveyor to another. An important feature of this invention, therefore, is that each intermittently moving conveyor is started by means actuated by each oncoming sheet and is stopped by means actuated by the same or another sheet on it to halt each sheet in turn in at least one predetermined position. In other words, the stopping of the conveyors is controlled by the sheets themselves.

Naturally the full advantages of mechanisation will not be obtained unless the number of operatives required is reduced to a minimum. I attain this result by so constructing the whole plant that the movements of the sheets and the operations performed are initiated by the arrival of each fresh sheet. In other words, the plant may be regarded as comprising a series of conveyors or operating apparatus, each of which must perform some movement or cycle of operations, and as each sheet in turn is delivered to the plant the movements and cycles of operations are set in train directly or indirectly, each conveyor and apparatus coming to a stop when its movements or cycle is complete. As sheets flow through the plant, one may, for example, be trimmed while another is being coloured and a third is being lifted and stacked. Naturally these operations on the different sheets do not all take place simultaneously, but in effect the lifting and stacking of the third sheet is caused to take place as a result of a single initial operation every time a fresh sheet is permitted by the operator to start on its journey through the plant.

It is not necessary for every conveyor or apparatus to operate intermittently. For example the edges of the sheets parallel to the direction of movement may be trimmed by rotary knives driven continuously while the plant is in operation and cutting through each sheet as it is carried past them.

In the preferred plant the first conveyor receives each sheet from the making machine and the last apparatus is a stacking apparatus, the sheets never being handled between their formation and their assembly into stacks of shaped products.

In the manufacture of asbestos-cement or like products on a large scale, it is necessary (except in the very largest works) in order to meet the varied needs of the zone in which the factory is situated, for the output of one or two machines to be converted into a whole range of products. This, in the smaller factories, can only be achieved by transporting the plastic sheets to dispersed and varied manipulative apparatus. Admittedly in the larger factories individual machines can be directly associated with apparatus for making a group of similar products, but it is rare for it to be economically practicable to convert the whole output of a single making machine into a single product. In any case, such direct association of a making machine with apparatus of limited scope is undesirable since although at times it might be necessary to work a machine continuously in making, say, corrugated sheets, the machine might be idle at other times when the demand was largely for other products to which a machine especially equipped to make corrugated sheets could not make a contribution. Moreover, even if the whole output is to be converted into corrugated sheets it does not follow that these will be all of the same size or have corrugations of the same kind. For these reasons, flexibility in the operations which can be performed by a complete plant associated with a single making machine is highly desirable and is afforded by means of the present invention. In principle, this is done by providing alternative or branch conveyor lines with means for causing the sheets from a single making machine to travel along whichever of the lines is desired.

At this stage it may be pointed out that the automatic conveyance of plastic sheets through the plant introduces special problems because of the ease with which damage can be done to the sheets. If a sheet is to be transferred from one conveyor to another aligned with it, the two conveyors must be moving at the same surface speed at the time of transfer. In any other case there must be transferring means cooperating with the two surfaces from and to which the sheet is to be transferred to ensure that the sheet leaves the one surface and makes contact with the other without relative movement in any direction parallel to the under surface of the sheet. These transferring means may be apparatus engaging each sheet by suction, in which case the oncoming sheets must be automatically halted at the right place to be engaged by the suction device of the apparatus, which must itself be automatically controlled to operate only when the sheet is halted. However, for various reasons, e. g. reduction in the number of adjustments required when changing over from the production of one product to another and reduction in the number of individual apparatus embodied in the plant, it is more convenient to effect the transfer wholly by conveyors.

This can be done by causing the oncoming conveyor to move rearwards as a whole at the same speed as its band moves forwards, so that in effect the sheet laps off the end of the conveyor without forward movement in space; of course, the surface onto which the sheet is delivered must be stationary at the time. This surface may be that of a transverse conveyor forming part of or leading to a branch line.

A particular feature of this invention is the provision of a conveyor frame mounted to reciprocate as a whole, an endless conveyor mounted in the frame, a motor or other driving means for reciprocating the frame, and an independent motor or other driving means mounted on the frame for driving the conveyor in the frame. By mounting this last motor on the frame it is possible to vary the relative speeds of the conveyor and the frame in any desired manner.

The production of corrugated sheets presents a special problem, which may be solved by the use of such a conveyor as that just described, that is to say, the sheets are delivered onto a corrugated former by a conveyor which moves rearwards as a whole while carrying the sheet forwards, so that each part of the sheet in turn laps onto the corrugated former without any longitudinal movement relatively to the former at the moment of contact. In such a case the conveyor band should move forwards faster than the frame moves rearwards, so as to allow for the fact that the surface onto which the sheet is delivered is corrugated and not flat.

The use of a transverse conveyor involves a change in the direction of movement of a sheet, that is to say, what was the side edge of the sheet becomes the leading edge. For various purposes this change in the direction of movement is desirable in itself, in that it increases the flexibility of the plant so far as the production of different products is concerned. For example, corrugated sheets of different lengths, from say, 4 feet to 10 feet, are commonly required and to produce the initial plastic sheets on a single making machine the manufacturer must either use interchangeable travelling felts of different widths or must use interchangeable forming bowls of different diameters. Changing a felt for one of another size introduces many complications and is very tedious, whereas changing a forming bowl is a relatively simple matter. Now the lapping method of corrugating the sheet has substantial advantages but for the usual sizes of corrugated sheets it requires that the long edge (that is to say, the one of length dependent on the diameter of the forming bowl and constituting the side edge of the sheet delivered by the forming bowl) should lead as the sheet is delivered to the corrugated former, and a change in the direction of movement of the sheet is therefore required.

The manner in which branch lines are provided and operated will be more clearly understood by a description of one plant, which is shown by way of example in the accompanying drawings, in which:

Figure 1 is a diagram of the layout of the complete plant;

Figures 2, 2A, 2B, 2C, 2D, 2E, and 2F, 2G and 2H together form a somewhat diagrammatic plan of the plant, the relative positions of these figures being indicated in Figure 1;

Figures 3, 3A, 3B and 3C together form a section on the line III—III in Figures 2B, 2C, 2E and 2G;

Figures 4 and 4A together form a section on the line IV—IV in Figures 2, 2A and 3B but are on a larger scale;

Figure 5 is a sectional elevation (on the line V—V in Figure 4A) showing the first two conveyors of the plant;

Figure 6 is a diagram illustrating a corrugating operation;

Figure 7 is a diagrammatic perspective view

Figure 8A:
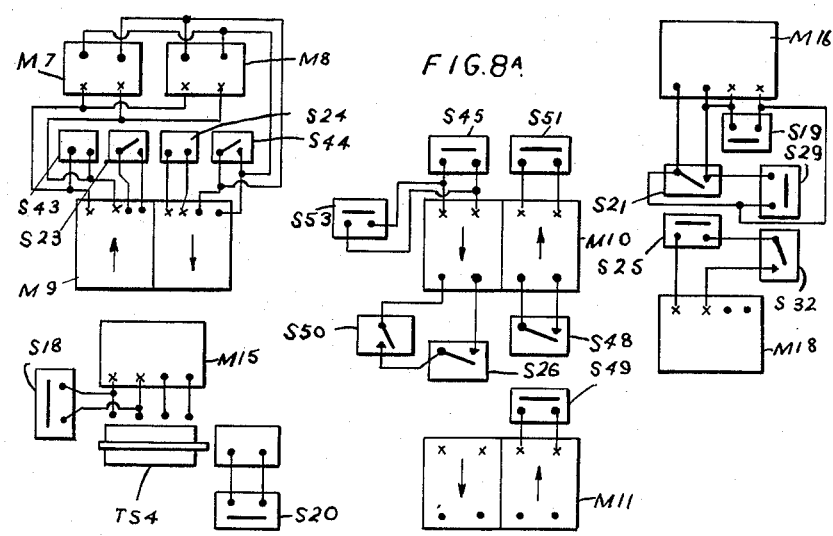
Figure 9:
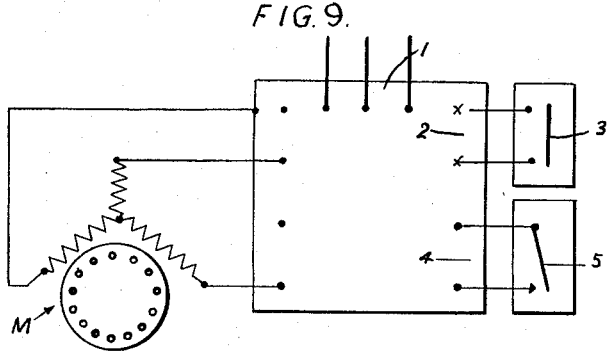
Figure 10:
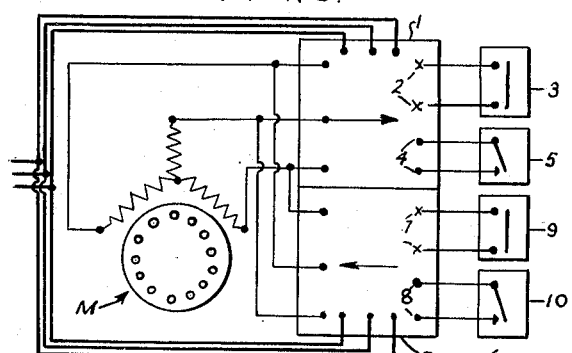

Figures 8 and 8A together form a circuit diagram of the switches and motors; and Figures 9 and 10 are explanatory electrical diagrams.

The plant shown is intended for the conversion of wet asbestos-cement sheets made one by one on a forming bowl or rotary cylinder of a making machine of the Hatschek type into stacks of flat sheets, corrugated sheets and slates, any of which may have to be coloured. The rotary cylinder is shown at Y and successive laminations of asbestos-cement are built up on it by transfer from an endless conveyor felt X. When a thick enough covering of asbestos-cement has been built upon the cylinder a cut is made through it parallel to the axis of the cylinder as usual, and the sheet is detached from the cylinder. It passes on to a conveyor A, which is started by the operator just before he makes the cut and which travels slightly faster than the sheet does in unwinding itself from the cylinder Y. The plant includes a main conveyor line (shown in Figures 3A, 3B and 3C) aligned with the conveyor A, and designed to produce coloured products, a second or branch conveyor line designed to produce uncoloured flat sheets, and a third or branch line designed to produce uncoloured corrugated products.

Figure 1:
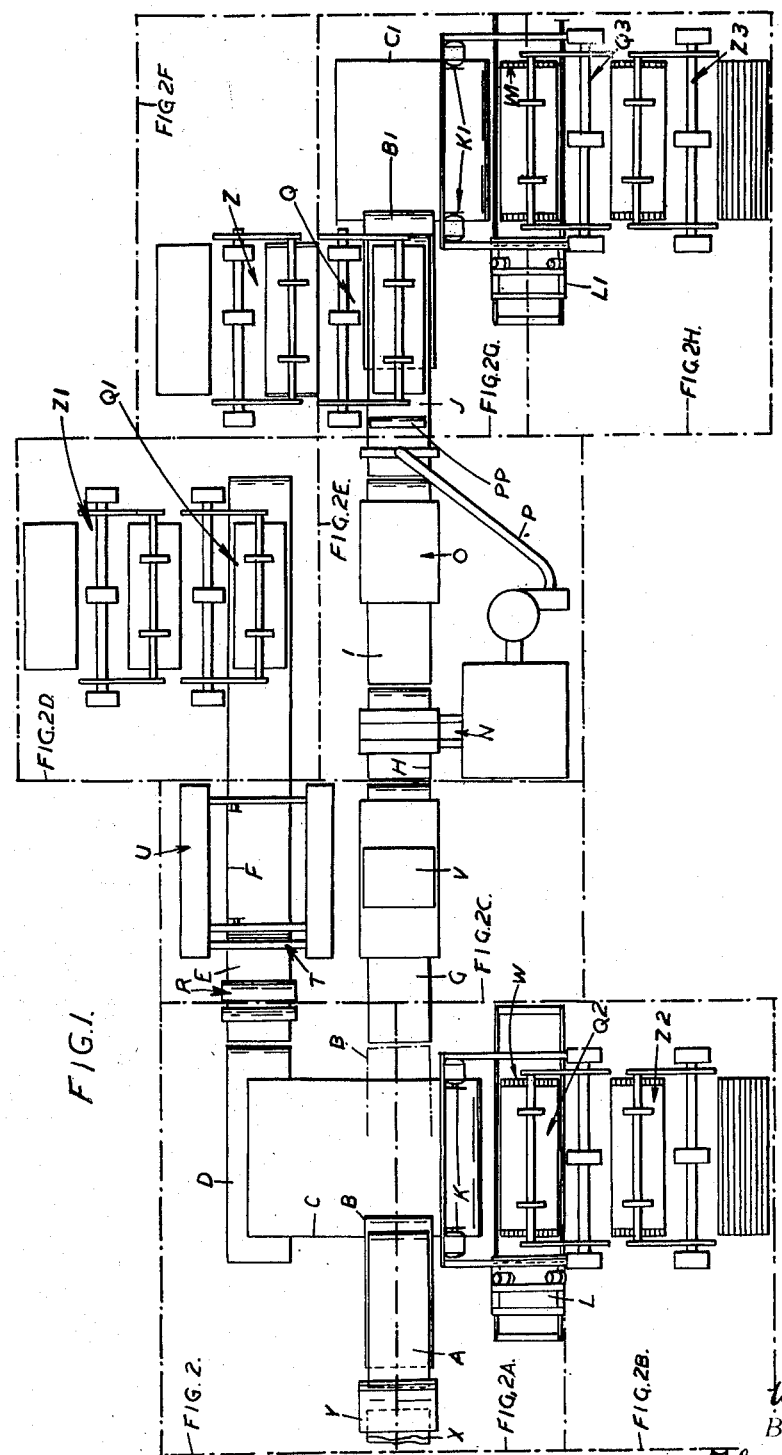
Figure 2:
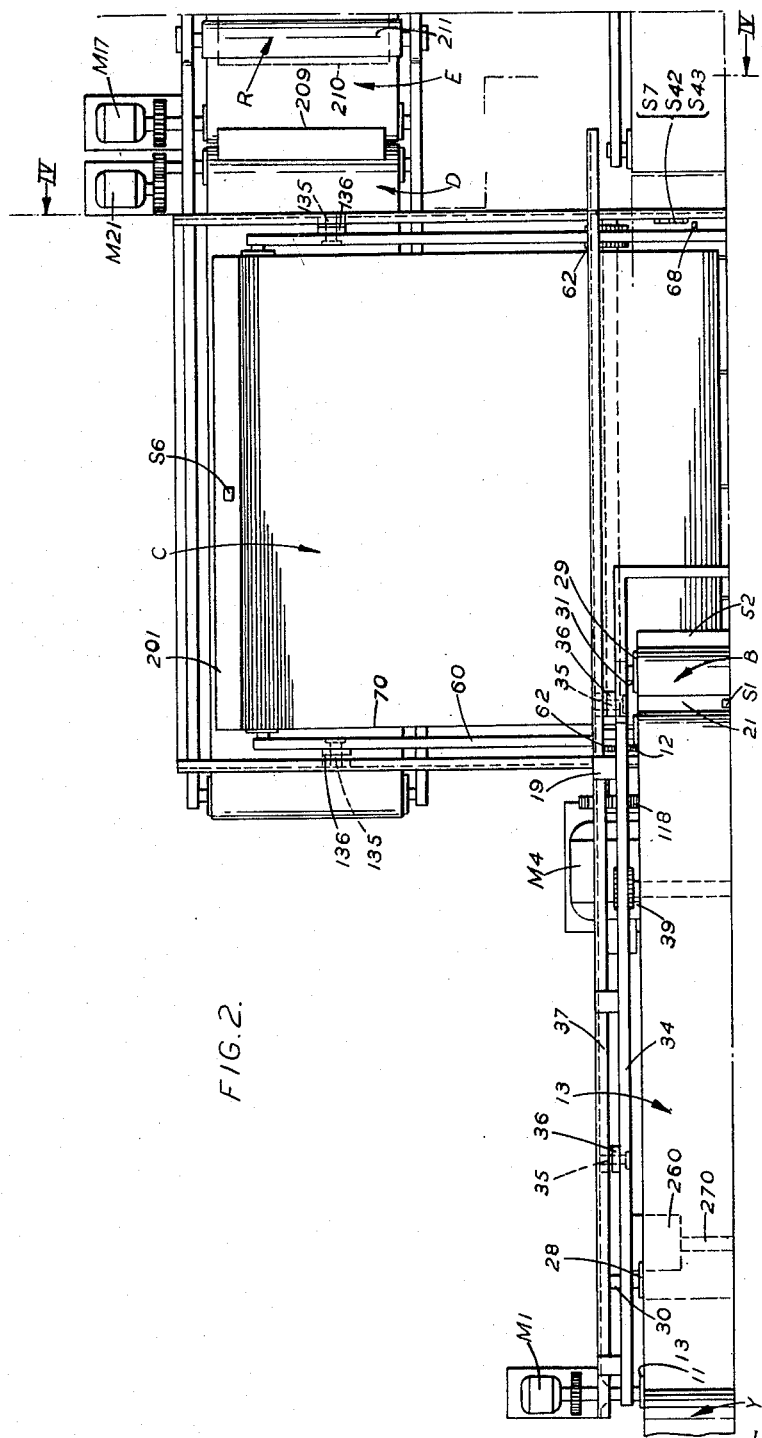
Figure 2H:
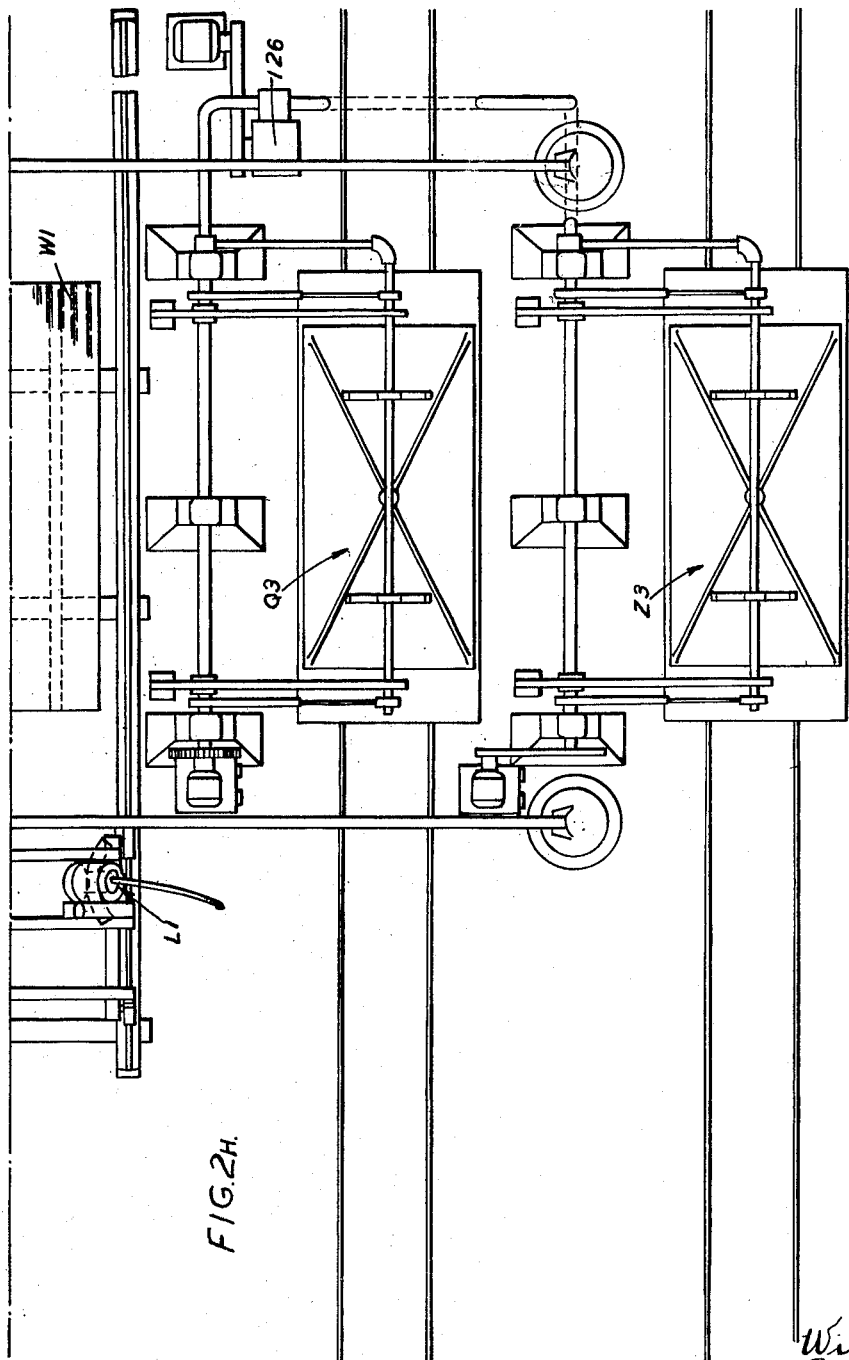

Whatever product is being made the sheet is delivered by the conveyor A to a second conveyor B which has an endless band mounted in a frame which is bodily movable as a whole in the direction of movement of the band from a position in which it lies nearly completely beneath the conveyor A (as shown in full lines in Figure 1) to one in which it bridges over a transverse conveyor C (as shown in dotted lines in Figure 1). The frame of the conveyor B is automatically caused to start moving out from beneath the conveyor A as a sheet reaches the end of the conveyor A. During the bodily outward movement the band of the conveyor B does not move in relation to the frame, so the conveyor B acts as a moving bridge to receive the sheet and carry it over the transverse conveyor C. The conveyor C is capable of bodily movement to the left or right of the main conveyor line and is used when the branch lines are operative. When the sheets are to proceed further down the main line, the frame of the conveyor B stops at the end of the bridging movement and its band begins to move, so that the sheet is delivered to the first conveyor G in the main line.

The operating apparatus associated with the main conveyor line are a slate-cutting press V, means N for colouring the slates (or sheets if the press V is not employed to form slates), these means N comprising (as described in application No. 674,018 of even date herewith, now abandoned), hoppers for feeding bitumen and colour on to the slates, an oven O for fluxing the bitumen, a suction apparatus P for removing excess colouring matter, a roller PP for consolidating the colouring matter and an apparatus Q for lifting the slates and building them into stacks, this apparatus being constructed as described in application No. 673,792 of even date herewith, now Patent Number 2,579,094. The slates in the stacks are interleaved with templates put in position by another lifting and stacking apparatus Z.

The main line comprises the conveyor G which carries the sheets to and past the slate-cutting press, another conveyor H working beneath the colouring means N, a third conveyor I travelling through the oven O and a fourth conveyor J travelling beneath the suction apparatus P and to the lifting apparatus Q.

The apparatus so far described are used when coloured slates are to be produced. If uncoloured flat sheets are to be produced the bridging conveyor B is used for changing the direction of movement of a sheet through 90°. It will be appreciated that a plastic sheet can normally only be transferred from one conveyor to another if they are moving at the same speed. By using a conveyor which moves as a whole bodily in the opposite direction to and at the same speed as the upper run of its band moves in relation to its frame, the sheet can be delivered over its end with zero speed in space, so that the sheet will be deposited onto a stationary conveyor underneath without being damaged. Accordingly the conveyor B is stopped earlier in its bodily movement and is caused to move backwards bodily at the same instant as the band is started, so that the conveyor B, instead of delivering a sheet to the main line, deposits it gently on the transverse conveyor C, which is stationary at the time. This conveyor C resembles the conveyor B in that it has a reciprocating frame but its band is composed of slats carried by chains mounted in the frame. When a sheet has been deposited on the conveyor C, the frame of which at this time is in its extreme left-hand position (looking from the forming bowl Y down the main line) its band is driven to carry the sheet to the delivery edge, which lies over the far edge of the first conveyor D of a second line. As the sheet reaches this edge the frame of the conveyor C begins to move bodily back while the band continues to run so that the sheet is deposited on to the conveyor D. This branch line is completed by two conveyors E and F. The conveyor E is part of a consolidating apparatus R and it delivers the sheet to the conveyor F. The conveyor F carries the sheet past a side-trimming apparatus T and under an end-trimming apparatus U to lifting and stacking apparatus QI and ZI which are identical with the apparatus Q and Z.

In uncoloured corrugated sheets are to be made the sheets are delivered to the transverse conveyor C instead of to the main line, but now the conveyor C moves bodily to the right and delivers each sheet to a corrugated former W in the manner described in application No. 673,790 filed June 1, 1946. This former W is stationary, and the feeding is effected in principle by causing the frame of the conveyor C to carry the sheet over the former W while the band of the conveyor is stationary in relation to the conveyor frame. When the conveyor C has moved outwards to the maximum extent, i. e. its leading end has travelled right across the former W and lies over the far edge of that former, the conveyor is stopped. At the same time its band begins to move, carrying the sheet with it. When the sheet reaches the end of the conveyor C, the latter begins to move backwards as a whole at a lower speed than that of the band in the frame, the backward bodily movement of the conveyor C together with the forward movement of the band resulting in the sheet lapping on to and conforming with the corrugated former W. This is illustrated diagrammatically by Figure 6.

In the production of corrugated sheets, the ends of each sheet are trimmed by an apparatus K while the sheet is on the conveyor C, and the sides are trimmed by an apparatus L while the sheet is on the former W. The corrugated sheets are lifted from the former W and stacked with interleaved templates by apparatus Q2 and Z2 which are also identical in principle with the apparatus Q and Z.

It will be seen that the use of the conveyors B and C results in the sheet being presented to the former W with its long edge leading that is to say the direction of movement of the sheet has changed. It is because of this change in the direction of movement that the band of the conveyor C is slatted, since this band must be so wide, in order to accommodate the longest sheets, that an endless rubber or like belt cannot conveniently be used.

If coloured corrugated sheets are to be made the colouring apparatus in the main line is used. Accordingly the slate-cutting press V and lifting apparatus Q are put out of operation and each coloured sheet is led to a corrugating former W1 arranged at one side of the main line beyond the lifting and stacking apparatus Q. This is done by another bodily movable conveyor B1 lying in its inoperative position beneath the conveyor J and arranged to move out over an end transverse conveyor C1 which delivers the coloured sheets to the corrugated former W1 in the same way as the main transverse conveyor C delivers the uncoloured sheets when it moves to the right. The coloured corrugated sheets are trimmed by apparatus K1 and L1 identical with the apparatus K and L and are lifted and stacked with interleaved templates by apparatus Q3 and Z3 identical with the apparatus Q2 and Z2.

It will be realised that any material cut from the edges of the sheets must be disposed of. Pieces severed by cuts made parallel to the sides of a conveyor may be deflected laterally as the conveyor travels and caused to fall over its sides or through openings made in the conveyor itself; pieces severed by cuts made transverse to the direction of movement may be engaged by devices moving across the conveyor; and if there is no apparatus between the production of the pieces and the stacking apparatus the pieces may simply be carried on by the conveyor to fall over its end after the sheet has been removed by the stacking apparatus. In any case hoppers may be provided for the reception of the cut pieces and may deliver them onto waste conveyors, which may conveniently work in channels below the level of the floor.

Having thus explained the nature of the various apparatus associated with the conveyor lines, I turn to the conveyors themselves and the manner in which they are operated. At the same time enough detail of the various operating apparatus (which per se form no part of this invention) will be given to enable the principle of operation to be understood.

All the conveyors are electrically driven and the motors of those which move intermittently are controlled through electric switches operated automatically as the sheets flow through the plant. The conveyors and their motors and associated switches are shown in Figure 7 which is purely diagrammatic, and the electrical circuits are shown in Figures 8 and 8A.

As it is important that the intermittently moving motors of the conveyor should start and stop them quickly, they are of the type which develop a high starting torque and are equipped with electro-magnetic brakes. They are all started and stopped through standard contactor starters which are illustrated diagrammatically in Figures 8 and 8A in accordance with a convention shown in detail in Figures 9 and 10. Figure 9 shows a motor M which is driven through a control circuit in a starter 1 which contains starting contacts 2 in circuit with a normally open switch 3 and stopping contacts 4 in circuit with a normally closed switch 5. The motor is started by the closing of the switch 3 and continues to run, whether the switch 3 is operated again or not, because the starter embodies a standard maintaining circuit (not shown). The motor is stopped by the opening of the switch 5 which breaks the maintaining circuit, and the motor can be restarted only when that switch has closed again.

When the motor must be reversible, a reverse starter 6 is used as well as a forward starter 1, and the starters are shown in the manner illustrated by Figure 10. The reverse starter has starting and stopping contacts 7 and 8 in circuit respectively with switches 9 and 10.

For the sake of simplicity neither the actual motors nor the supply leads are shown in Figure 8 but the starters (whether single or forward and reverse) are identified by the reference characters of the motors themselves.

The conveyors A and B are shown in detail in Figures 2, 2A, 4A and 5. The conveyor A is composed of an endless rubber band 13 which runs over end rollers 11 and 12, carried in a fixed frame 19 appropriately located in relation to the forming bowl Y. The driving roller 11 is driven by a motor M1, which is controlled through a manual switch S (see Figure 8) by an operator stationed at the forming bowl Y, and it is started just before the axial cut is made through the material on the forming bowl. Thus the conveyor A is running when the sheet unwinds itself from the forming bowl and it continues to run until it has delivered the sheet on to the conveyor B, whereupon it is stopped by the operator. The switch S is of standard start-and-stop push-button construction.

At the end of the conveyor A there is an inclined plate 21 fixed in the frame 19. As each sheet reaches the end of the conveyor A it slides over this plate and in so doing closes an electric switch S1 which is a microswitch, i. e. is of the type which has a small closing movement and is closed through a thin steel blade which yields under the weight of the sheet. The closing of the switch S1 starts an electric motor M2 which causes the conveyor B to begin to move out from under the conveyor A.

The conveyor B has a band 27 which runs over rollers 28 and 29 having shafts 30 and 31 carried in bearings in a rectangular frame 34. This frame is provided with lateral shafts 35 carrying rollers 36 which run in fixed channel members 37 which are united to the frame 19. The frame 34 has rack teeth 38 on its underside, these teeth being engaged by pinions 39 driven through gearing 40 by the motor M2.

The forward speed of the frame 34 of the conveyor B is the same as that of the band of the conveyor A, so the sheet is deposited gently and without damage on the conveyor B.

The further movement of the sheet, that is to say the choice of the conveyor line along which it passes, depends upon thte products which it is desired to make. It is possible to send every sheet along either of the two branch lines. To enable this to be done, a bank of five switches S27, S30, S31, S38 and S39 is arranged at a main control panel to control the movement of some or all of the sheets to the left or right. The switches S27, S30, S31, S38 and S39 are all mounted on a rod 41 which can be moved axially by a handle 42. The first four of these switches are of the throw-over type and the fifth (S39) simply opens and closes a pair of contacts. To cause sheets to travel to the right the rod 41 is pulled to the right as seen in Figure 8 and to cause sheets to travel to the left it is pushed to the left.

It is convenient first to consider the operation when uncoloured products are being made.

Assuming that uncoloured corrugated sheets are to be made, the rod 41 is pulled to the right at the beginning of the operations, then the conveyor B after receiving a sheet continues to move out until a projection 45 on the frame 34 engages a switch S2 which is mounted on the frame 19. This switch S2 has two arms 46 and 47 rigid with one another and mounted to rock on a rod 49, the arm 47 being engaged by the projection 45 so that the two arms are rocked together to allow the projection 45 to pass and to bring the arm 46 into the path of the projection on the return movement of the conveyor frame 34. The rod 49 carries two further switches S34 and S35 which have arms rocked by the projection 45 in the same way as and simultaneously with the arms of the switch S2, these switches differing only in that they are normally open whereas the switch S2 is normally closed.

The rocking of the switch S2 serves to stop the motor M2 and that of the switch S34 to start the motor M2 in the reverse direction. The rocking of the switch S35 starts a motor M3. This motor M3 is mounted on the frame 34 and connected by a belt 50 to a pulley 51 on the shaft 31, so that the band of the conveyor B now starts to run while the frame of the conveyor moves backwards. The provision of the motor M3 on the frame 34 allows the band 27 to be driven independently and without difficulty, no matter what the position of the frame. The leads to the motor may conveniently be suspended overhead, as shown at 188.

The speed of the band 27 in the forward direction is the same as that of the frame 34 in the rearward direction and the result is that the sheet is delivered onto the conveyor C without movement as a whole in relation to that conveyor, each successive part of the sheet being gently laid onto the conveyor C. The sheet in passing from the conveyor B to the conveyor C slides over a fixed inclined plate 52 similar to the plate 21.

The conveyor B continues to move back until a projection 53 on the frame 34 engages three switches S4, S36 and S37 which are of the same general type as the switch S2 and are also mounted on the frame 19. The motor M3 is stopped by the switch S4 and the motor M2 is stopped by the switch S36. The conveyor B thus remains stationary until the next sheet comes from tthe forming bowl. The switch S37 serves to start a motor M4 by which the conveyor C is caused to move bodily towards the former W.

The conveyor C has a frame 60 which has rack teeth 61 engaged by pinions 62 which are driven by the motor M4. The frame 60 carries a projection 63 which engages switches S8, S40 and S41 (of the same type as the switch S2), the switch S8 stopping the motor M4 and the switch S40 starting another motor M5. The switch S41 is in series with the switch S39, which is open at this time. The motor M5 is mounted on the underside of a bracket 185 which projects forwards and upwards from the frame 60 and carries rollers 69 which engage rails 187 forming part of the main frame. The motor M5 drives the slatted band 70 of the conveyor C through a belt 64 and a pulley 65 carried by a shaft 66 mounted in the frame 60. As a result, the sheet is carried forward on the slatted band and on reaching the end slides over an inclined plate 67 in which a switch S5 is mounted. This switch is of the same type as the switch S1 and when it is closed it starts the motor M4 in the reverse direction, so that the frame 60 begins to move back while the band still runs forward. The speed of backward movement of the frame is less than the speed of forward movement of the slatted band 70, with the result that the sheet is caused to lap gently onto and conform with the surface of the former W, as diagrammatically illustrated in Figure 6. The frame 60 continues to move backwards until a projection 68 on it engages a switch S42 (also of the same type as the switch S2) by which the motor M4 is stopped.

Before the sheet reaches the end of the slatted band 70 it is engaged by the end-trimming apparatus K. This comprises a frame 75 spanning the conveyor C and supporting brackets 74 and 76 which carry knives 77 and 78 at a distance apart equal to the length of the finished corrugated sheet. These knives register with grooves in flat plates 79 and 80 rigid with the brackets 74 and 76. These plates 79 and 80 just come into contact with the upper surface of the conveyor band 70 and have bevelled edges so that when the sheet reaches them it rides over them without being damaged. As the sheet passes over these plates the knives 77 and 78 cut through it, thus separating end strips from the sheet proper. The knives 77 and 78 are driven continuously by motors M6 and M26 respectively.

The end strips severed by the knives 77 and 78 encounter and are held by bottomless shoes 71 and 72 carried by the brackets 74 and 76, the edges of these shoes being in register with the knives so that the end strips are prevented from making contact with and damaging the body of the sheet. It is necessary to allow these end strips to escape and for this purpose the band 70 formed by the slats is not continuous; instead enough slats are omitted to form openings 81 and 82, and when these openings come beneath the shoes 71 and 72 the end strips fall through them into a waste-removal hopper 85. Because of the provision of the openings 81 and 82 the band 70 of the conveyor C must always return to the same starting position in relation to its frame 60, since otherwise the one or other opening might be found beneath the end of the conveyor B when a sheet was being delivered to the conveyor C. Accordingly the motor M5 continues to run after the delivery of the sheet onto the former W until the band 70 has made one complete revolution in its frame 60. The motor is then stopped by a switch S22 carried by the frame 60 and operated by a projection 83 carried by a chain 84 of the conveyor C. This switch is of the kind which resets itself under spring action as soon as the projection 83 passes by.

When a sheet is on the former W its sides are trimmed by the apparatus L (see Figures 2A and 3). This apparatus comprises a reciprocating carriage 100 having wheels 101 which run on rails 113 spanning and arranged parallel to the edge of the former W and transverse to the direction of movement of the conveyor C. The carriage carries two inclined rotary knives 102 and 103 mounted to cut the side edges of the sheet along two corrugations. The knives 102 and 103 are driven by motors M7 and M8 respectively, and the carriage itself is driven by a motor M9, all the motors being mounted on the carriage. When the motor M9 runs the carriage is moved along the rails 113 over the former W and at the same time the motors M7 and M8 rotate the knives 102 and 103. Having traversed the sheet the carriage reverses and knives must stop, and when the next sheet is in position the same movements must take place. The motor M9 must therefore be reversible. Accordingly what is required is that the motors should be started when a sheet has been deposited on the former and that thereafter the movements should take place automatically until the carriage 100 returns to its starting position. This result is obtained by the provision of a starting switch S43 at the same point as and operated by the same projection 68 as the switch S42, and three switches S23, S24 and S44 operated by the carriage 100. The switch S43 starts all three motors, the switch S23 stops the motor M9 at the end of the first traverse, the switch S24 simultaneously starts the motor in the opposite direction, and the switch S44 stops all three motors at the end of the second traverse.

The side strips cut off by the knives 102 and 103 are deflected away from the body of the sheet by deflector plates 117 which are fixed in the carriage 100 on each side of the knife 102 and deflector ploughs 119 which are similarly fixed on each side of the knife 103. The strips fall over the edges of the former W onto plates 121 and 122 respectively and slide down them into a waste hopper 123 from which they are removed by the waste-collecting conveyor.

After the sides have been trimmed the sheet is lifted and stacked by the apparatus Q2. This apparatus is constructed as described in application No. 673,792, now Patent Number 2,579,094, and it is enough to say here that it includes a suction box 130 carried by and mounted to swing in a frame 131 which itself is mounted to rock about a shaft 132. The apparatus is driven by a motor M10, which is started by the closing of a switch S45 located at the same point as and operated simultaneously with the switch S44. The motor first rocks the frame to lower the suction box onto the sheet. When the box reaches the sheet the suction box is put in communication with a suction pump 126, driven by a motor M32, and the motor M10 is reversed by the simultaneous operation of switches S50 and S51 through a mechanical actuating device (not shown) and rocks the frame back again, the sheet now adhering to the box under the suction action. The frame carries the box to the other side of the shaft 132 and deposits the sheet or slates on a trolley 129 whereupon the suction is released and the motor is again reversed by operation of switches S48 and S53 through the same mechanical actuating device. The frame 131 moves back again and on reaching its starting position is stopped by the actuation of a switch S26 in series with the switch S50.

In the stack built up in this way the sheet must be interleaved with templates. These are transferred from a trolley 134 by a lifting apparatus Z2 identical with the apparatus Q2 and working in alternating fashion with that apparatus to put a template on each sheet or set of plates. The apparatus Z2 is driven by a motor M11, which is started by a switch S49 located at the same point as and actuated simultaneously with the switch S48, so that the apparatus Z2 begins to operate just as the apparatus Q2 has desposited a sheet on the trolley 129. It will be seen that what is required to make the apparatus Q2 perform one complete cycle of operation and then stop on its starting position is to close the switch S45.

When an adequate stack has been built up on each trolley it is wheeled away and replaced by another.

When uncoloured flat sheets are to be produced the left-hand branch line is used, that is to say, as each sheet is deposited on the conveyor C, this must move to the left instead of to the right. Accordingly the switches S27, S30, S31, S38 and S39 on the main control panel are changed over by pushing the rod 41 to the left. The result is that the motor M5 runs in the opposite direction, the circuit to the contacts which must be closed when the motor M5 is to drive the band of the conveyor C to carry sheets to the right being opened by the switch S30, the starting contacts which must be closed when the motor is to drive the band in the opposite direction being put in circuit with a switch S37 by the switch S27, and the circuit through the switch S40 being broken. The connections to the motor M4 are changed over and it now ceases to be under the control of the switch S5 and comes under the control of an equivalent switch S6. At the same time the circuit through the switch S37 to the motor M4 is broken and a corresponding one through the switch S40 is made.

A further alteration necessary is of a mechanical nature. When the conveyor C transfers a sheet to the conveyor D its band must run at the same forward speed as its frame moves backwards, so the apropriate adjustment is made in a variable gear 118 through which the motor M4 drives the conveyor frame.

The conveyor C always comes to rest with its frame in its position furthest to the left. When the switch S37 is closed after a sheet has been deposited on the conveyor C with the bank of switches in the left-hand position just described, the motor M5 is started and carries the sheet towards the conveyor D. At the end of the conveyor C the sheet passes over an inclined plate 201 in which the switch S6 (which is of the same type as the switch S1) is mounted. This switch S6 causes the motor M4 to start, so that the frame 60 of the conveyor C moves backwards and the sheet is gently deposited on the conveyor D. When the frame 60 has moved back so far that the whole sheet is on the conveyor D, the projection 63 on the frame operates the switches S8, S40 and S41. The opening of the switch S8 stops the motor M4, and the closing of the switch S40 starts it in the reverse direction so that the conveyor frame 60 moves back again until the projection 68 on it engages the switch S42 by which the motor M4 is stopped.

The closing of the switch S41 starts a motor M21 which drives the conveyor D and a motor M17 which drives the conveyor E. The motor M5 continues to run until it is stopped by a switch S33 of the same kind as the switch S22.

The conveyor E, in passing to which the sheet travels over a plate 209, differs from the other conveyors in having a porous belt. It carries the sheet to the apparatus R, which comprises a suction box 210 and rollers 211 and 212 which press downwards on the sheet and which are also driven by the motor M17.

The next apparatus is the side-trimming apparatus T. This is identical in principle with the end-trimming apparatus K and includes rotary knives 213 and 214, which are driven continuously by motors M22 and M27 respectively.

The apparatus R does not have to operate on each sheet while it is stationary, so the conveyor E is made of such a length that each time the conveyor starts it receives a sheet from the conveyor D and carries it to the conveyor F. This conveyor must bring each sheet to a halt twice, once opposite the trimming apparatus T and once opposite the stacking apparatus Q1, and it is accordingly essential that the sheets should be exactly spaced upon it and that the distance travelled by the conveyor at each movement should be constant.

In passing from the conveyor E to the conveyor F the sheet passes over and actuates three switches S16, S46 and S52 arranged side by side and all of the same kind as the switch S1. The switch S16 is closed by the sheet to start a motor M23 by which the conveyor F is driven.

The motors M21 and M17 by which the conveyors D and E are driven are stopped by the operation of a switch S7 by the projection 68 on the frame 60 of the conveyor C at the same time as the switch S42 is operated. It is essential that the sheet should be completely transferred to the conveyor F before the conveyor E stops, and it is for this reason that the switch S46 is provided, this switch being put in parallel with the switch S7, as shown in Figure 8, so that the motors M21 and M17 must run until the sheet has cleared the switch S46 and allowed it to open.

In the course of its travel on the conveyor F the sheet engages a group of switches, which are mounted side by side above the conveyor on a bracket 215 and are all actuated by the upper surface of the sheet. One of these switches, S15, is normally closed and is opened by the sheet to stop the motor M23, so that the sheet is brought to a halt opposite the end-trimming apparatus U. Here, it will be seen, one sheet starts the conveyor and the sheet ahead of it stops the conveyor.

The apparatus U is similar to the apparatus L in that is comprises rotary knives which move across the sheet. In this case, however, two frames 240 and 241 extending across the conveyor are provided, one for each knife, the frame 240 being adjustable as a whole towards and away from the frame 241. Knife-carriers 242 and 243 are mounted to slide along the frame above the conveyor. The sliding movement of each carrier is effected through a chain which is housed in the frame and connected at its ends to opposite sides of the carrier. The chains are respectively driven by reversible motors M24 and M25. The knives are shown at 244 and 245 and are driven by the same motors. Thus when each motor is started the corresponding carrier is caused to travel across the conveyor, carrying with it the knife, which is rotated during the whole movement. On reaching the other end of the frame the motor is reversed and the carrier is moved back again to its starting position. In other words each motor M24 and M25 is automatically controlled in the same way as the motor M9, so only the circuits containing the forward starting contacts need be described and the other circuits are not shown in Figure 8.

Both motors M24 and M25 are started by a switch S47, which is in the same group as the switch S15 and remains closed so long as the sheet engages it. On the other hand the motors must be stopped and reversed when the knives have moved once across the sheet. Accordingly the switch S47 is not directly connected to the starting contacts of the motors M24 and M25 but instead a time switch TS1 is interposed, this relay being actuated by a solenoid 231 energised by the closing of the switch S47 to close the starting contacts of the motors momentarily and then opening these contacts again; the solenoid 232 is de-energised when the switch S47 is opened as a result of the sheet upon it being carried onwards.

To prevent damage to the conveyor by the knives 244 and 245, grooved shoes 246 and 247 are mounted on the knife-carriers 242 and 243 to travel beneath the sheet as the carriers traverse the conveyor. The trimmings are allowed to travel forward with the sheet.

The motor M23 must be started through the switch S16 by the following sheet despite the fact that the switch S15 is held open by the sheet. It is for this reason that the switch S52 is provided and it is arranged in parallel with the switch S15, so that the latter is short-circuited when the switch S52 is closed.

The closing of a switch S54 in the same group as the switch S15 serves to start a motor M28 by which the lifting apparatus Q1 is driven. This apparatus lifts the cut sheet away from the trimmings, which are delivered over the end of the conveyor F. In the same way as the motor M9, the motor M28 runs while the apparatus Q1 is performing its own cycle of operations and then stops. In addition, it initiates the cycle of operations of the apparatus Z1. For simplicity only the starting circuit of the motor M28 is shown in Figure 8.

When coloured products are to be made the main line is used. In the particular plant shown it is not generally feasible to send every sheet along the main line in the plant shown. The reason is that each sheet must be held in the oven O for a period of time greater than the interval between the delivery of successive sheets from the forming bowl Y when the making machine is being operated at an economical rate. Accordingly provision is made for automatically delivering sheets along the main line and one or other of the branch lines in alternating fashion, and in fact every second, third or fourth sheet can be sent along the main line, the remainder being sent along one or other of the branch lines. To enable this to be done selector means are provided by which the switches S2, S34 and S35 are rendered inoperative whenever it is desired to sent a sheet down the main line instead of either to the left or right with the result that the conveyor B travels right over the conveyor C and delivers the sheet to this conveyor G. Those sheets which do not travel down the main line pass either to the left or the right in accordance with the setting of the bank of changeover switches by the rod 41 as explained above. The selector means are such that the switches S2, S34 and S35 can be rendered inoperative for every sheet if so desired, so that all the sheets can be passed down the main line.

The selector means are partly mechanical and partly electrical. The mechanical part is a counter rotor indicated generally at 260 and having an arm 261 (Figure 8) which is carried on a shaft 270 to which a pinion 271 is connected through a one-way clutch 272. The pinion 271 engages a short rack 273 on the underside of the frame 34 of the conveyor B and is turned through 90° every time the frame 34 moves forward and turns the shaft 270, and therefore the arm 261, through 90° also. When the frame 34 moves back again the pinion is turned in the reverse direction but because of the provision of the clutch 272 the rotor arm 261 is not turned. The electrical part of the selector means comprises broadly a selector switch S10 having an "off" position (in which no sheets travel down the main line) and four "on" positions (respectively used according as one, two, three or all of every four sheets are to travel down the main line), together with electrical connections such that every time the rotor arm 261 turns through 90° a circuit is either made or left open in accordance with the setting of the selector switch S10.

The selector switch S10 is in the form of a rotary drum 250 with four contact strips 251, 252, 253, and 254 co-operating with four pairs of contacts 255, 256, 257 and 258. The rotary contact arm 261 in turning closes each of four pairs of contacts 262, 263, 264, and 265 in its successive 90° positions. These contacts are respectively connected in series with the contacts 255 to 258. Accordingly if none of the latter contacts is closed by the strips on the drum 250 the contact arm 261 never completes any circuit in the course of its movement. This is what happens when it is desired to send all the sheets either to the right or to the left, the selector switch S10 being then in its "off" position, which is the one shown in Figure 8.

When the selector switch S10 is in its first "on" position in which the strip 251 closes the contacts 255, a circuit is completed every time the contact arm 261 bridges the contacts 262. As a result two solenoids 270 and 271 are energised and move their armatures to the right (as seen in Figure 8) to close a switch S58 and open three other switches S59, S60 and S61. The closing of the switch S58 short-circuits the switch S2, so that the opening of this switch on the forward movement of the frame of the conveyor B does not stop the motor M2. The opening of the switch S59 prevents any circuit being made when the switch S34 is closed, the opening of the switch S60 likewise prevents any circuit being made when the switch S35 is closed, and the opening of the switch S61 prevents any circuit being made when the switch S37 is closed. Accordingly neither of the motors M3 and M5 is started and the frame of the conveyor B continues to move forwards until the projection 45 engages arms by which a group of four switches S3, S55, S56 and S57 (of the same type as the switch S2) are operated, these switches being all mounted on the frame 19. On this operation, the switch S3 stops the motor M2, the switch S55 (which short-circuits the switch S60) starts the motor M3 and the switch S56 starts a motor M12 which drives the band of the conveyor G at the same speed as the band of the conveyor B. The sheet is therefore transferred smoothly from the one conveyor to the other and carried beneath the slate-cutting press V. The operation of the switch S57 energises solenoids 280 and 281 which actuate two time switches TS2 and TS3 which, after a sufficient time interval to allow the sheet to pass wholly onto the conveyor G, respectively operate to start the motor M2 in the reverse direction and to stop the motor M3. The frame 34 of the conveyor B therefore moves backwards until it operates the switch S4 and stops.

It will be seen that the result of moving the selector switch S10 into its first "on" position is that a sheet is delivered to the main line every time the contacts 262 are closed, that is to say, once in every four forward movements of the conveyor B, so that one sheet in four passes down the main line. If more sheets are to pass down the main line the selector switch S10 is turned further, so that the strip 251 bridges the contacts 256 and the strip 252 bridges the contacts 255. Then two sheets in every four will pass down the main line. Still more sheets can be similarly passed down the main line by moving the switch S10 into the third or fourth "on" position as the case may be.

The slate-cutting press V is another self-contained apparatus and comprises a bed plate 140 and an operating head 141 from which cutting edges 142 extend downwards to divide each sheet into slates as it is carried over the bed plate 140 by the conveyor G. The head 141 is reciprocated by an hydraulic ram 143 actuated by a pump working submerged in a tank 144 and driven by a motor M13. The conveyor G must be stationary with the sheet exactly beneath the cutting edges 142 when the head descends and the head 141 must pause at the bottom of its stroke, rise and then stop until the next sheet is beneath it. The motor M13, once it has started, continues to run until the press has completed one cycle and then it is stopped. The press also includes means for removing the trimmings cut off the sheet by the cutting edges 142. The end trimmings are engaged by toothed chains 145 which are moved transversely over the conveyor F immediately after the head has descended and carry the trimmings away laterally. These chains are driven by a motor M29 which is started by a switch S28 operated by a projection 146 on the head of the press and runs during the pause at the bottom of the stroke of the press, being stopped when the switch S28 is disengaged by the projection 146. The side trimmings are removed by ploughs 147 aligned with the lateral cutting edges 142.

It will be seen that, so far as the control of the press is concerned, all that is required is that the motor M13 should be started by a switch, the remaining movements taking place automatically, and accordingly only the circuit to the starting contacts of the motor M13 are shown in Figure 8. The motor is started by a switch S62 located at the same point as and operated simultaneously with another switch S17 which is in circuit with the stopping contacts of the motor M12. Both switches are carried by a bracket 150 extending across the conveyor G. This conveyor is made long enough to carry two sheets at once, and each sheet is stopped in turn under the head of the press V by the engagement of the switch S17 by the following sheet, the simultaneous engagement of the switch S62 serving to start the motor M13, so that the press operates. The conveyor G remains stationary until the conveyor B again operates the switch S56.

It will be seen that in this case, as it is not feasible to provide a switch under the head of the press to be operated by each sheet as it arrives at the point at which it must stop, a following sheet is used as the means for halting each sheet in turn in the right position.

When the conveyor G starts again, the sheet which has been cut by the press V is delivered to the conveyor H, which is driven continuously by a motor M14 at the same surface speed as that of the conveyor G and which takes the slates to the colouring unit N.

This unit N operates continuously. It includes two hoppers 160 and 161, each having a sieve at its lower end, which are fed with powdered bitumen and pigment respectively from containers 162 and 163. The materials are extracted from these containers by worms 164 and 165 and delivered to elevators 166 and 167 by which they are discharged into troughs 168 and 169 containing worms 170 and 171. These deliver the materials into the hoppers 160 and 161 and they are distributed over the sieve bottoms of the hoppers by rotary brushes 172 and 173. As a result the conveyor H, which is made from open-mesh wire, is subjected to a continuous shower of bitumen and pigment. When the slates pass under the hoppers 160 and 161, the showers from the hoppers form first a layer of bitumen and then a layer of pigment on top of the layer of bitumen. The powders which do not strike a slate fall through the conveyor into two collecting chutes 174 and 175 and are returned to the containers 162 and 163, the pigment actually passing through a preheater 184 on its way to the container 163. The moving parts of the bitumen and pigment apparatus respectively are driven by continuously running motors M30 and M31.

As the slates reach the end of the conveyor H they pass over a switch S18 of the same kind as the switch S1, which starts a motor M15 which drives the conveyor I, onto which the slates pass. This conveyor passes through the oven O, in which the powdered bitumen is fluxed to form both a binding agent for the pigment and a waterproof coating on the sheet or slates. The oven is kept at a constant temperature by means of gas jets 178 and a flue 179 is provided for the escape of vapours. It is important that the slates should be halted in the middle of the oven and maintained there for an exact predetermined time. The conveyor I must therefore be stopped at the right position and started again at a predetermined time after it has stopped. These movements of the conveyor I are controlled through a switch S20 and a time switch TS4. The switch S20 resembles the switch S62 and is carried by a bracket 177 which is adjustable in position along the conveyor I. When the switch S20 is operated it energises the switch TS4, which is of the rotary drum type and is set to operate and stop the motor M15 when the slates are exactly in the middle of the oven. The switch TS4 once energised performs a cycle of operations and it maintains the motor M15 stopped for the exact time during which the slates must stay in the oven O. The switch TS4 then closes a circuit containing the starting contacts of the motor M15, so that the conveyor I carries the slates out of the oven and delivers them to the conveyor J. This conveyor is driven by a motor M16, and it is started by the operation of a switch S19 (of the same kind as the switch S1) located at the end of the conveyor I. The motor M15 continues to drive the conveyor I until it is stopped by the switch TS4 when enough time has elapsed to allow the slates all to pass from the conveyor I to the conveyor J, the switch TS4 then itself completing the cycle of operations.

While on the conveyor J the sheets are subjected to suction to remove any pigment which has not been bound to them by the bitumen in the oven O. This suction is applied by the apparatus P, which comprises a suction fan 180 driven continuously by a motor M33, the suction side of the fan being connected through a pipe 181 to a nozzle 182 and the discharge side of the fan delivering into a cyclone 183, from which the pigment is removed through a chute 185 to the preheater 184, which is steam-jacketed and serves to preheat all the pigment entering the container 163.

As the slates emerge from beneath the apparatus P they are subjected to the action of the roller PP which is mounted to rotate freely in the frame of the conveyor J and smooths the pigmented surface of the slates.

Just before reaching the roller PP the slates pass under a switch S21 (of the same kind as the switch S17) which is carried by a bracket 155 and which stops the motor M16. The conveyor J is long enough to carry two sets of slates at once, and when the set which has just passed onto it operates the switch S21 the leading set is exactly opposite the lifting apparatus Q. A switch S25 located at the same point as and operated with the switch S21 starts the apparatus Q by closing the circuit of a motor M18 by which it is driven. The lifting apparatus Q then performs exactly the same cycle of operations as that described in connection with the apparatus Q2 and also initiates the similar cycle of the apparatus Z, which is driven by a motor M19 and lifts templates from a trolley 192. In consequence the slates are stacked with interleaving templates on a trolley 190.

If coloured flat sheets (as distinguished from slates) are required, the cutter 142 of the press V is replaced by another which merely trims the edges of the sheets without dividing them.

If coloured corrugated sheets are required two switches S29 and S32 (Figure 8) are manually closed to short-circuit the switch S19 and prevent any circuit being made through the switch S25 so that the conveyor J runs continuously and the lifting apparatus Q is not operated. The conveyor J may be then regarded as the equivalent of the conveyor A. On leaving the conveyor J each sheet closes a switch S9, which is the exact equivalent of the switch S1, and so starts a motor M20 by which the conveyor B1 is moved bodily. It will readily be understood that further switches are then operated and motors started and stopped to make the conveyors and apparatus B1, C1, K1, L1, Q3 and Z3 function in the same way as the corresponding conveyors and apparatus described above. These switches include S63, S64 and S65 respectively equivalent to the switches S2, S34 and S35, switches S11, S66 and S67 respectively equivalent to the switches S4, S36 and S37, a switch S12 equivalent to the switch S5, a switch S13 equivalent to the switch S42, and switches S14 and S68 respectively equivalent to the switches S8 and S40. The motors include M34, M35 and M36 respectively equivalent to the motors M3, M4 and M5.

I claim:

1. A plant for handling plastic sheets comprising a rotary cylinder on which the sheets are built up as coatings and from which they are delivered one by one upon an axial cut being made through the coating, an endless conveyor having a reciprocating frame and arranged at right angles to the axis of the rotary cylinder, a second endless conveyor having a reciprocating frame and arranged parallel to the axis of the rotary cylinder to receive sheets from the first conveyor, means actuated by each sheet on the first conveyor for causing the frame of this conveyor to move rearwardly upon the arrival of the sheet at the discharge end while the conveyor surface continues to move forwardly so as to deposit the sheet on the second conveyor, means controlled by the first conveyor for causing the second conveyor to carry the sheet thus deposited upon it towards a stationary surface and means controlled by the sheet for causing the frame of the second conveyor to move rearwardly upon the arrival of the sheet at the discharge end while the conveyor surface continues to move forwardly so as to deliver the sheet onto the stationary surface.

2. A system for handling sheets of plastic material, comprising a plurality of coplanar horizontal conveyors, an endless conveyor common to said plurality of conveyors and disposed at a higher level, means for placing sheets on said common conveyor, said common conveyor having a frame movable in a horizontal plane to cause said common conveyor to deliver the sheets carried by it onto any desired one of said coplanar conveyors, means controlled by a sheet on the common conveyor for initiating the operation of a first one of said coplanar conveyors as said sheet approaches the latter conveyor, and means operated responsive to the completion of the transfer of a sheet from the common conveyor to a second one of the coplanar conveyors for initiating the operation of said second conveyor.

3. An apparatus for handling sheets of plastic material, comprising an endless conveyor having a reciprocatory frame, means for depositing plastic sheets one by one on the conveyor, a second conveyor having a reciprocatory frame arranged crosswise and below the level of the first conveyor to receive sheets from the first conveyor, means actuated when the first conveyor has brought a sheet into position above the second conveyor for causing the frame of the first conveyor to move rearwardly while the conveyor surface continues to move forwardly so as to deposit the sheet on the second conveyor, means controlled by the first conveyor for causing the second conveyor to carry the sheet thus deposited upon it towards a stationary surface, and means controlled by the sheet for causing the frame of the secondary conveyor to move rearwardly upon arrival of the sheet at the discharge end while the conveyor surface continues to move forwardly so as to deliver the sheet onto the stationary surface.

4. Apparatus for handling sheets of plastic material comprising an endless conveyor, means for depositing plastic sheets on the conveyor one by one, a second endless conveyor having a reciprocatory frame arranged parallel to and below the first conveyor, a device on the first conveyor frame actuated responsive to the arrival of a sheet at the delivery end of the first conveyor, mechanism controlled by said device for driving the frame of the second conveyor forward from beneath the first conveyor at a speed equal to the rate of delivery of the sheet over the edge of the first conveyor, means on the second conveyor frame actuated when this conveyor frame has reached a predetermined forward position for initiating both the forward movement of the upper surface of the second conveyor and the return movement of the second conveyor frame, a third conveyor with a reciprocatory frame mounted at a lower level than and at right angles to the second conveyor, a device actuated responsive to the second conveyor frame reaching a predetermined position on its return movement, mechanism controlled by said last device for moving the frame of the third conveyor outward and means on the third conveyor actuated by a sheet upon its arrival at the delivery end of the third conveyor for initiating both the forward movement of the upper surface of the third conveyor and the return movement of the third conveyor frame so that the sheet is delivered by the third conveyor onto a stationary surface without sliding movement between the sheet and that surface.

5. Apparatus as in claim 4 wherein each of said frames carries an individual motor for driving the conveyor on that frame.

6. Apparatus for handling sheets of plastic material, comprising an endless horizontal conveyor, means for placing sheets on the conveyor one by one, a second endless horizontal conveyor disposed below the level of the first conveyor to receive the sheets from the first conveyor, said second conveyor having a frame adapted to move in a horizontal plane, means operated responsive to the passage of the leading edge of a sheet from the first conveyor to the second conveyor for initiating a horizontal movement of the second conveyor's frame while maintaining the second conveyor stationary on said frame, means for halting said movement of the frame when the trailing edge of the sheet has passed from the first conveyor to the second conveyor, and mechanism thereafter operated to drive said second conveyor relative to its frame.

7. Apparatus for handling sheets of plastic material, comprising an endless horizontal conveyor, means for placing sheets on the conveyor one by one, a second endless horizontal conveyor disposed below the level of the first conveyor to receive the sheets from the first conveyor, said second conveyor having a frame adapted to move in a horizontal plane, means operated responsive to the passage of the leading edge of a sheet from the first conveyor to the second conveyor for initiating a horizontal movement of the second conveyor's frame while maintaining the second conveyor stationary on said frame, means for reversing the horizontal movement of the frame when the trailing edge of the sheet has passed from the first conveyor to the second conveyor, and mechanism operated during the reverse movement of the frame to drive said second conveyor relative to its frame.

8. Apparatus for handling sheets of plastic material, comprising an endless horizontal conveyor having a frame adapted to move in a horizontal plane, means for placing a sheet of plastic material on said conveyor, a second horizontal conveyor disposed below the level of the first conveyor for receiving the sheet therefrom, a mechanism for moving said frame horizontally and simultaneously moving said first conveyor on the frame thereby to transfer the sheet from the first conveyor to the second, said second conveyor being stationary during such transfer, and means operated responsive to the completion of the transfer for automatically initiating the operation of the second conveyor to move the article horizontally away from the situs of the transfer.

9. Apparatus as in claim 8 wherein said second conveyor is reversible, whereby it is adapted to move articles in either one of two directions away from the situs of transfer.

10. Apparatus as in claim 8 wherein said second conveyor comprises an endless element having a frame adapted to move in a horizontal plane, mechanism for moving said frame, and a device controlled by a sheet carried on said second conveyor for initiating the operation of said moving mechanism.

11. Apparatus as in claim 10 having mechanism for driving said endless element in either of two directions relative its frame.

12. Apparatus for handling sheets of plastic material, comprising an endless horizontal conveyor having a frame adapted to move in a horizontal plane, means for placing a sheet of plastic material on said conveyor, a second horizontal conveyor disposed below the level of the first conveyor for receiving the sheet therefrom, mechanism for moving said first conveyor relative to its frame to advance said sheet towards said second conveyor, means operated responsive to a sheet reaching the terminus of the first conveyor for automatically initiating a horizontal movement of the frame whereby the sheet is deposited upon the second conveyor without lateral movement in space, said second conveyor being stationary during such transfer, and means operated responsive to the completion of the transfer for automatically initiating the operation of the second conveyor to move the article horizontally away from the situs of the transfer.

13. Apparatus for handling discrete articles, comprising an endless conveyor having a frame adapted to move in a path paralleling the upper flight of said conveyor, means for placing an article on the conveyor, a second conveyor disposed below the level of the first conveyor to receive the article therefrom, mechanism for moving said frame along said path and simultaneously moving said first conveyor relative said frame thereby to transfer the article from the first conveyor to the second, said second conveyor comprising an endless element having a frame adapted to move in a direction paralleling the upper flight of that element, said last frame and element being stationary during said transfer of the article, means operated responsive to a predetermined movement of said first conveyor's frame for initiating the movement of said element on said second conveyor's frame thereby to move the article away from the situs of transfer, and means operated responsive to a predetermined movement of the article away from said situs for initiating a movement of said second conveyor's frame.

14. Apparatus for handling discrete articles, comprising an endless conveyor having a frame adapted to move in a path paralleling the upper flight of the conveyor, a second conveyor disposed below one end of the first conveyor to receive articles therefrom, means for placing an article on the first conveyor at a point removed from said one end and operating that conveyor relative its frame to advance the article toward said one end, a device operated responsive to an article reaching a predetermined position over the second conveyor for initiating a movement of the frame along said path to assist the transfer of the article from the first conveyor to the second, and means operated responsive to a predetermined movement of the frame for initiating the operation of the second conveyor to move the article away from the situs of transfer.

15. Apparatus for handling sheets of plastic material comprising an endless conveyor, means for depositing the plastic sheets on the conveyor one by one, a second endless conveyor arranged parallel to the first conveyor and under the discharge end thereof, means for driving the two conveyors in the same direction thereby to transfer the sheets from the first conveyor to the second, a third conveyor disposed below the first conveyor and transverse thereto, said first conveyor having a frame movable in a horizontal direction to bring the discharge end thereof over said third conveyor, and means for moving the frame of the first conveyor rearwardly during the advance of a sheet over the discharge end thereof onto the third conveyor.

16. Apparatus for handling sheets of plastic material comprising a normally stationary conveyor, drive mechanism therefor, means for feeding sheets successively onto said conveyor, an operable control mechanism controlling said drive mechanism, said control mechanism having a first control switch positioned adjacent the feed end of the conveyor to be actuated by a sheet approaching the conveyor and adapted when actuated to render said drive mechanism operative to drive the conveyor and a control mechanism including a second switch positioned intermediate the ends of the conveyor to be actuated by a sheet moved onto and arriving at a predetermined position on the conveyor and adapted when actuated to render said drive mechanism inoperative to drive the conveyor, and a time mechanism actuated by said second switch for restarting the said drive mechanism a pre-determined length of time after the actuation of said second control switch by a sheet.

17. Apparatus for handling sheets of plastic material as set forth in claim 16 and in which said time mechanism renders said drive mechanism inoperative a pre-determined length of time after said drive mechanism has been restarted by said time mechanism, whereby the control mechanism is conditioned for response to actuation of said first control switch.

WILLIAM HOLDSWORTH ROOKSBY.

REFERENCES CITED

The following references are of record in the file of this patent:

UNITED STATES PATENTS

| Number | Name | Date |
| --- | --- | --- |
| 1,313,375 | Frazier | Aug. 19, 1919 |
| 1,355,488 | McKenny | Oct. 12, 1920 |
| 1,482,197 | Kimball | Jan. 29, 1924 |
| 1,570,484 | Hanson | Jan. 19, 1926 |
| 1,704,706 | Hawley | Mar. 12, 1929 |
| 1,831,245 | Hitchcock | Nov. 10, 1931 |
| 1,846,083 | Bowker | Feb. 23, 1932 |
| 1,871,832 | Absmeier | Aug. 16, 1932 |
| 1,873,316 | Droitcour | Aug. 23, 1932 |
| 1,913,533 | Brunner | June 13, 1933 |
| 1,952,950 | Spence et al. | Mar. 27, 1934 |
| 1,985,563 | Gerald | Dec. 25, 1934 |
| 2,000,292 | Miller | May 7, 1935 |
| 2,011,440 | Dorn et al. | Aug. 13, 1935 |
| 2,017,156 | Mattler | Oct. 15, 1935 |
| 2,084,980 | Sweeney | June 22, 1937 |
| 2,173,391 | Ellis | Sept. 19, 1939 |
| 2,276,083 | Moeller | Mar. 10, 1942 |
| 2,339,268 | Huffman | Jan. 18, 1944 |

FOREIGN PATENTS

| Number | Country | Date |
| --- | --- | --- |
| 323,680 | Great Britain | Jan. 23, 1930 |